United States Patent
Hori et al.

(10) Patent No.: US 9,002,662 B2
(45) Date of Patent: Apr. 7, 2015

(54) TORQUE CALCULATION METHOD, CALCULATION DEVICE, AND CALCULATION PROGRAM FOR FOUR-POINT CONTACT BALL BEARING

(75) Inventors: Michio Hori, Kuwana (JP); Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 246 days.

(21) Appl. No.: 13/552,822

(22) Filed: Jul. 19, 2012

(65) Prior Publication Data
US 2012/0283965 A1 Nov. 8, 2012

Related U.S. Application Data

(63) Continuation of application No. PCT/JP2011/050525, filed on Jan. 14, 2011.

(30) Foreign Application Priority Data

Jan. 20, 2010 (JP) .................................. 2010-010259

(51) Int. Cl.
G01L 5/00 (2006.01)
G01M 13/04 (2006.01)
(Continued)

(52) U.S. Cl.
CPC ............. G01M 13/04 (2013.01); F16C 19/166 (2013.01); F16C 19/181 (2013.01); F16C 2360/31 (2013.01)

(58) Field of Classification Search
CPC .. F16C 19/166; F16C 19/181; F16C 2360/31; G01M 13/04
See application file for complete search history.

(56) References Cited

U.S. PATENT DOCUMENTS 4,509,871 A 4/1985 Herzog et al.
6,378,382 B1 * 4/2002 Noguchi et al. ........... 73/862.29
(Continued)

FOREIGN PATENT DOCUMENTS

DE 3244258 5/1984
JP 2000-162092 6/2000
JP 2003-172341 6/2003
(Continued)

OTHER PUBLICATIONS

International Preliminary Report on Patentability issued Aug. 16, 2012 in corresponding PCT/JP2011/050525.
(Continued)

Primary Examiner — Elias Desta

(57) ABSTRACT

The method for calculating rotational torque between inner and outer rings of a four point contact ball bearing assembly includes an individual torque calculation step for calculating the rotational torque for each of rolling elements and a total sum calculation step for determining the rotational torque. In the individual torque calculation step, data on a contact condition representative of the extent of approximation to the two point contact state or four point contact state is used. For the contact condition data, the four point contact ratio $C_f$, which is the ratio of surface pressure of one of respective maximum contact pressures $P_1$ and $P_2$ between two partial raceways in an inner ring or outer ring, which one is higher than the other of the maximum contact pressures $P_1$ and $P_2$, relative to a surface pressure of the other of the maximum contact pressures, is used.

7 Claims, 14 Drawing Sheets

(51) Int. Cl.
*F16C 19/16* (2006.01)
*F16C 19/18* (2006.01)

(56) References Cited

U.S. PATENT DOCUMENTS 7,572,061 B2 * 8/2009 Fox et al. .................. 384/494
8,556,245 B2 * 10/2013 Sueoka et al. ............... 269/56

FOREIGN PATENT DOCUMENTS

| JP | 2006-177774 | 7/2006 |
| JP | 2006-316915 | 11/2006 |

OTHER PUBLICATIONS

Brochure available from Rothe Erde GmbH, "Slewing Bearings", 2004.
International Search Report of PCT/JP2011/050525 mailed Apr. 19, 2011.
Notification of Reasons for Rejection mailed Sep. 24, 2013 in corresponding Japanese Application No. 2010-010259.
Chinese Office Action issued on Sep. 15, 2014 in corresponding Chinese Patent Application No. 201180006629.1.
Chinese Office Action dated Apr. 1, 2014 in corresponding Chinese Patent Application No. 201180006629.1.

* cited by examiner

RADIAL DISPLACEMENT  AXIAL DISPLACEMENT

DEFINITION OF $P_1$, $P_2$

RELATION OF FOUR POINT
CONTACT RATIO $C_f$ AND TORQUE

RELATION OF $C_f$ AND ROTATION AXIS

TEST RESULT (Fa LOADED)

TEST RESULT (Fr LOADED)

RESULT FROM NOVEL CALCULATION EQUATION (Fa LOADED)

RESULT FROM NOVEL CALCULATION EQUATION (Fr LOADED)

RESULT FROM CURRENT CALCULATION EQUATION (Fa LOADED)

RESULT FROM CURRENT CALCULATION EQUATION (Fr LOADED)

TEST RESULT

TEST RESULT

TWO POINT CONTACT STATE

FOUR POINT CONTACT STATE

CONTACT STATE OF ROLLING ELEMENT

TORQUE CALCULATION METHOD, CALCULATION DEVICE, AND CALCULATION PROGRAM FOR FOUR-POINT CONTACT BALL BEARING

CROSS REFERENCE TO THE RELATED APPLICATION

This application is a continuation application, under 35 U.S.C. §111(a), of international application No. PCT/JP2011/050525, filed Jan. 14, 2011, which claims priority to Japanese patent application No. 2010-010259, filed Jan. 20, 2010, the disclosure of which are incorporated by reference in their entirety into this application.

BACKGROUND OF THE INVENTION

1. Field of the Invention

The present invention relates to a torque calculation method, a calculation device and a calculation program for calculating the rotational torque induced between inner and outer rings in a four point contact ball bearing, which are all applicable to the four point contact ball bearing assembly of a kind used in, for example, a slewing bearing assembly, used in a wind power generating equipment for yawing or a blade assembly, or a slewing bearing assembly used in medical equipments such as a CT scanner.

2. Description of Related Art

In the bearing assembly for use in the wind power generating equipment or for medical equipment in, for example, the CT scanner, the single or double row four point contact ball bearing assembly has hitherto been employed. The slewing bearing assembly having the four point contact ball bearing structure has long been employed in applications such as a slewing unit in hydraulic excavators and cranes. Although in those applications, for a given rotational torque necessary to slew the bearing assembly, a drive device having a sufficient (torque) capacity has been employed, demands have now been increasing in the market to downsize, and promote the efficiency of, the wind power generating equipment and, therefore, it is an important key issue to accurately comprehend the rotational torque.

In these days, the following equation for calculating the rotational torque in the slewing bearing assembly is currently employed:

<Conventional Calculation Equation>

$$T = \mu \times dm/2 \times Poa$$

wherein T represents the rotational torque [kN·m], µ represents the coefficient of friction, dm represents the ball PCD [m], and Poa represents the static equivalent axial load [kN].

PRIOR ART DOCUMENTS

[Non-patent Document 1] Brochure available from Rothe Erde GmbH, entitled "Slewing Bearings", published in Germany in 2004.

SUMMARY OF THE INVENTION

It has, however, been found that the conventional calculation equation referred to above has some problems. Specifically, according to the definition of the static equivalent axial load Poa, the foregoing equation applies where the maximum rolling element load equally acts on all of the rolling elements, but in practice, however, individual rolling element loads differ from each other because of influences brought about by, for example, a radial load and/or a moment load. Also, it is impossible to take into account influences brought about by the difference in state of contact (two point contact or four point contact), which is a unique problem inherent in the four point contact ball bearing assembly.

In view of the foregoing, the present invention has for its object to provide a torque calculation method, a calculation device and a calculation program for a four point contact ball bearing assembly, which are effective to determine the value of the rotational torque with high accuracy in consideration of the influences brought about by the difference in state of contact, which is a problem peculiar to the four point contact ball bearing assembly.

To summarize the present invention, the torque calculation method for a four point contact ball bearing assembly designed in accordance with the present invention is to calculate the rotational torque for each of the rolling elements with the contact condition taken into account and then to determine the sum thereof to render it to be the rotational torque.

More specifically, this torque calculation method for calculating a rotational torque acting between inner and outer rings of a four point contact ball bearing assembly, which method comprises:

an individual torque calculation step for calculating a rotational torque T for each of rolling elements; and a total sum calculation step for calculating the sum of respective rotational torques T of all of the rolling elements to determine the resultant sum to be the rotational torque T0 acting between the inner and outer rings;

in which in the individual torque calculation step, calculation is made using data on a contact condition representative of an extent of approximation to either one of a two point contact state and a four point contact state.

According to this torque calculation method, since the calculation is made with the contact condition, which is representative of the extent of approximation to either one of the two point contact state and the four point contact state, taken into consideration, the value of a highly accurate rotational torque can be determined in consideration of influences brought about by the difference in contact condition which has been a problem peculiar to the four point contact ball bearing assembly.

In the practice of this torque calculation method of one embodiment of the present invention, as information containing the data on the contact condition, using the respective maximum contact pressures $P_1$ and $P_2$ between two raceways, which form respective raceways in an inner ring or an outer ring, and rolling elements, the maximum contact pressure sum $P_S$ defined for those two maximum contact pressures $P_1$ and $P_2$ to be represented by a single parameter us determined from the two maximum contact pressures $P_1$ and $P_2$ according to a predetermined equation, and using, with respect to the four contact ratio $C_f$, which is the ratio of the lower pressure relative to the higher pressure and which is determined by the following equation;

$$C_f = \min(P_1, P_2)/\max(P_1, P_2) \quad 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$, predetermined calculation equations that are divided into two on the boundary of $C_f = 0.5$, the rotational torque T for each of the rolling elements may be calculated from the contact pressure sum $P_S$. In this case, the two partial raceways means raceway portions positioned on respective side of the bottom of the raceway, that is, the minimum diametric portion of the raceway in the inner ring or the maximum diametric portion of the raceway in the outer ring in a direction axially of the bearing assembly and, where either the inner ring or the outer ring is of a unitary element that is not split, those two partial raceways form a raceway comprised of a single continuous raceway.

As compared with the case in which the rotational torque is calculated directly from the two maximum contact pressures $P_1$ and $P_2$ the use of the contact pressure sum $P_S$ referred to above is effective to allow the rotational torque to be calculated from each of the rolling elements through a simple mathematic calculation. On the boarder of the four point contact ratio $C_f$ being 0.5, the contact pressure sum $P_S$ is such that the tendency to change the torque divided by the contact pressure sum $P_S$ makes a sudden change. When the four point contact ratio $C_f$ is greater than 0.5, the torque becomes substantially constant and, as compared with the case with the four point contact ratio $C_f$ being zero, such torque will become 8 to 12 times. When the four point contact ratio $C_f$ is within the range of 0 to 0.5, it changes parabolically. For this reason, with the boarder of the four point contact ratio $C_f$ being 0.5, by calculating the rotational torque T for each of the rolling elements from the contact pressure sum $P_S$ with the use of the predetermined calculation equation that has been dived into two, the rotational torque T can be accurately and easily calculated.

In the torque calculation method of one embodiment of the present invention, an equation necessary to determine the contact pressure sum $P_S$ may be as follows:

$$P_S = (P_1^4 + P_2^4)^{1/4}$$

This is because the fourth power of the contact pressure is considered proportional to the rotational torque.

In the torque calculation method of one embodiment of the present invention, the rotational torque, which is applicable when the four point contact ratio $C_f$ is greater than 0.5 while the rotational torque when the four contact ratio $C_f$ is zero is T, may be of a value multiplied by a predetermined multiplication number that is within the range of 8 to 10. Also, the rotational torque T applicable when the four point contact ratio $C_f$ may be within the range of 0 to 0.5 is of a value complemented by a quadratic function of the four point contact ratio $C_f$.

As hereinabove described, the torque will become substantially constant when the four point contact ratio Cf is greater than 0.5, and, as compared with the case in which the four point contact ratio Cf is zero, it will become 8 to 12 times because, when the four point contact ratio Cf is within the range of 0 to 0.5, it will change parabolically.

In the torque calculation method of one embodiment of the present invention, the rotational torque T may be calculated according to the following equations, using the four point contact ratio $C_f$, the contact pressure sum $P_S$ and the coefficient C determined for each bearing assembly;
when $0 \leq C_f < 0.5$, $$T = (1 + 36 C_f^2) C P_S^4$$

and when $0.5 \leq C_f \leq 1.0$, $$T = 10 C P_S^4$$

The parameter C referred to above represents the coefficient that depends on some items of the specification of the bearing assembly (such as the number, dimensions and geometric shapes of the rolling elements) and, therefore, it is determined for each of the bearing assemblies. It is to be noted that the wording "determined for each of the bearing assemblies" referred to above does not necessarily means that it is determined for each of the bearing assemblies, but the same value and the same coefficient C may be employed for the same model number, that is, for the bearing assembly of the same shape, dimension and material.

In the torque calculation method of one embodiment of the present invention, the torque calculation method may be a method executed by the use of a computer, which method includes:

in addition to the individual torque calculation step and the total sum calculation step;

a step of calculating the contact pressure for each of the rolling elements;

the individual torque calculation step including an input step for inputting and storing in a storage region, a load (Fr(Fx, Fy), Fa, M(Mx, My)), acting on a bearing assembly, and a coefficient C determined for each of bearing assemblies;

a contact pressure sum calculation step for calculating the contact pressure sum $P_S$, defined for the respective maximum contact pressures $P_1$ and $P_2$ between two raceways in an inner ring or an outer ring and rolling elements to be represented by a single parameter in the individual rolling elements, determined in the calculation step, is determined by the following equation:

$$P_S = (P_1^4 + P_2^4)^{1/4}$$

a four point contact ratio calculation step for calculating a four point contact ratio $C_f$, which is the ratio of the lower pressure relative to the higher pressure that is determined by the following equation:

$$C_f = \min(P_1, P_2) / \max(P_1, P_2) \quad 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation step for calculating the rotational torque T according to the following equations, using the contact pressure total sum $P_S$, the four point contact ratio $C_f$ and the coefficient C;

$$T = (\text{Quadratic function of the four point contact ratio } C_f) \times C \times P_S^4$$

when $0 \leq C_f \leq 0.5$, and $$T = I \times C \times P_S^4 \text{ (} I \text{ being a constant selected from 8 to 12)}$$

when $0.5 \leq C_f \leq 1.0$.

In the torque calculation method of one embodiment of the present invention, the torque calculation method is a method executed with the use of a computer, in which the individual torque calculation step includes an input step for inputting and storing in a storage region, respective maximum contact pressures $P_1$ and $P_2$ between two partial raceways, forming raceways in an inner ring or an outer ring, and rolling elements in the individual rolling elements, and a coefficient C determined for each of bearing assemblies;

a contact pressure sum calculation step for calculating the contact pressure sum $P_S$, defined for the respective maximum contact pressures $P_1$ and $P_2$ to be represented by a single parameter, is determined by the following equation:

$$P_S = (P_1^4 + P_2^4)^{1/4}$$

a four point contact ratio calculation step for calculating a four point contact ratio $C_f$, which is the ratio of the lower pressure relative to the higher pressure that is determined by the following equation:

$$C_f = \min(P_1, P_2) / \max(P_1, P_2) \quad 0 \leq C_f \leq 1$$

wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$; and a contact ratio specific torque calculation step for calculating the rotational torque T according to the following equations, using the contact pressure total sum $P_S$, the four point contact ratio $C_f$ and the coefficient C;

$$T=(\text{Quadratic function of the four point contact ratio } C_f)\times C \times P_S^4$$

when $0 \leq C_f < 0.5$, and $$T=ICP_S^4 \text{ (I being a constant selected from 8 to 12)}$$

when $0.5 \leq C_f \leq 1.0$.

In the torque calculation method of one embodiment of the present invention, the method may be applied to a four point contact ball bearing assembly that is used at a low speed of dn value=not higher than 30,000. In the case of the bearing assembly having the low dn value, the calculation according to the method of the present invention is further effective.

The torque calculation method of one embodiment of the present invention may be applied not only to a single row four point contact ball bearing assembly, but also to a double row four point contact ball bearing assembly.

The torque calculation method of the present invention may be applied to not only to a bearing assembly for angularly adjustably supporting a blade assembly of a wind mill, but also to a bearing assembly in a wind mill for yawing and to a bearing assembly for medical equipment.

The torque calculating device of the present invention is a device for executing the torque calculation method referred to hereinabove, which device includes:

a contact pressure calculation unit for calculating the contact pressure for each of the rolling elements;

an individual torque calculation unit for executing the individual torque calculation step, and a total sum calculation unit for executing the total sum calculation step; in which the individual torque calculation unit includes:

an input section for inputting and storing in a storage region, a load (Fr(Fx, Fy), Fa, M(Mx, My)), acting on a bearing assembly, and a coefficient C determined for each of bearing assemblies;

a contact pressure sum calculation section for calculating the contact pressure sum $P_S$, defined for the respective maximum contact pressures $P_1$ and $P_2$ between two raceways in an inner ring or an outer ring and rolling elements to be represented by a single parameter in the individual rolling elements, determined in the calculation procedure, is determined by the following equation:

$$P_S=(P_1^4+P_2^4)^{1/4}$$

a four point contact ratio calculation section for calculating a four point contact ratio $C_f$, which is the ratio of the lower pressure relative to the higher pressure that is determined by the following equation:

$$C_f=\min(P_1,P_2)/\max(P_1,P_2) \quad 0 \leq C_f \leq 1$$

wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$; and a contact ratio specific torque calculation section for calculating the rotational torque T according to the following equations, using the contact pressure total sum $P_S$, the four point contact ratio $C_f$ and the coefficient C;

$$T=(\text{Quadratic function of the four point contact ratio } C_f)\times C \times P_S^4$$

when $0 \leq C_f < 0.5$, and $$T=I \times C \times P_S^4 \text{ (I being a constant selected from 8 to 12)}$$

when $0.5 \leq C_f \leq 1.0$.

The torque calculating device of one embodiment of the present invention is a device for executing the torque calculation method referred to hereinabove, which device includes:

an individual torque calculation unit for executing the individual torque calculation step; and a total sum calculation unit for executing the total sum calculation step; in which the individual torque calculation unit for storing in a storage region, when the respective maximum contact pressures $P_1$ and $P_2$ between two partial raceways, forming raceways in an inner ring or an outer ring, and rolling elements in the individual rolling elements, and a coefficient C determined for each of bearing assemblies are inputted;

a contact pressure sum calculation section for calculating the contact pressure sum $P_S$, defined for the respective maximum contact pressures $P_1$ and $P_2$ to be represented by a single parameter is determined by the following equation:

$$P_S=(P_1^4+P_2^4)^{1/4}$$

a four point contact ratio calculation procedure for calculating a four point contact ratio $C_f$, which is the ratio of the lower pressure relative to the higher pressure that is determined by the following equation:

$$C_f=\min(P_1,P_2)/\max(P_1,P_2) \quad 0 \leq C_f \leq 1$$

wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$; and a contact ratio specific torque calculation section for calculating the rotational torque T according to the following equations, using the contact pressure total sum $P_S$, the four point contact ratio $C_f$ and the coefficient C;

$$T=(\text{Quadratic function of the four point contact ratio } C_f)\times C \times P_S^4$$

when $0 \leq C_f < 0.5$, and $$T=I \times C \times P_S^4 \text{ (I being a constant selected from 8 to 12)}$$

when $0.5 \leq C_f \leq 1.0$.

In the torque calculating device of one embodiment of the present invention, the calculation of the rotational torque in the contact ratio specific torque calculation section, when $0 \leq C_f < 0.5$, may be carried out according to the following equation:

$$T=(1+36C_f^2)CP_S^4$$

The torque calculation program of the present invention is a program for causing the computer to execute the torque calculation method referred to hereinabove, which program includes:

a contact pressure calculation procedure for calculating the contact pressure for each of the rolling elements;

an individual torque calculation procedure for executing the individual torque calculation step, and a total sum calculation procedure for executing the total sum calculation step;

in which the individual torque calculation procedure includes:

an input procedure for inputting and storing in a storage region, a load (Fr(Fx, Fy), Fa, M(Mx, My)), acting on a bearing assembly, and a coefficient C determined for each of bearing assemblies;

a contact pressure sum calculation procedure for calculating the contact pressure sum $P_S$, defined for the respective maximum contact pressures $P_1$ and $P_2$ between two raceways in an inner ring or an outer ring and rolling elements to be represented by a single parameter in the individual rolling elements, determined in the calculation procedure, is determined by the following equation:

$$P_S = (P_1^4 + P_2^4)^{1/4}$$

a four point contact ratio calculation procedure for calculating a four point contact ratio $C_f$ which is the ratio of the lower pressure relative to the higher pressure that is determined by the following equation:

$$C_f = \min(P_1, P_2)/\max(P_1, P_2) \; 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T according to the following equations, using the contact pressure total sum $P_S$, the four point contact ratio $C_f$ and the coefficient C;

$$T = (\text{Quadratic function of the four point contact ratio } C_f) \times C \times P_S^4$$

when $0 \leq C_f < 0.5$, and $$T = I \times C \times P_S^4 \; (I \text{ being a constant selected from 8 to 12})$$

when $0.5 \leq C_f \leq 1.0$.

The torque calculation program of the present invention is a program for causing the computer to execute the torque calculation method referred to hereinabove, which program includes:

an individual torque calculation procedure for executing the individual torque calculation step; and a total sum calculation procedure for executing the total sum calculation step; and in which the individual torque calculation procedure comprises:

an input procedure for inputting and storing in a storage region, a load (Fr(Fx, Fy), Fa, M(Mx, My)), acting on a bearing assembly, and a coefficient C determined for each of bearing assemblies;

a four point contact ratio calculation procedure for calculating a four point contact ratio $C_f$, which is the ratio of the lower pressure relative to the higher pressure that is determined by the following equation:

$$C_f = \min(P_1, P_2)/\max(P_1, P_2) \; 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T according to the following equations, using the contact pressure total sum $P_S$, the four point contact ratio $C_f$ and the coefficient C;

$$T = (\text{Quadratic function of the four point contact ratio } C_f) \times C \times P_S^4$$

when $0 \leq C_f < 0.5$, and $$T = I \times C \times P_S^4 \; (I \text{ being a constant selected from 8 to 12})$$

when $0.5 \leq C_f \leq 1.0$.

In each of the calculation programs referred to above, the calculation of the rotational torque in the contact ratio specific torque calculation section, when $0 \leq C_f < 0.5$, may be carried out according to the following equation:

$$T = (1 + 36 C_f^2) C P_S^4$$

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

Figure 1:
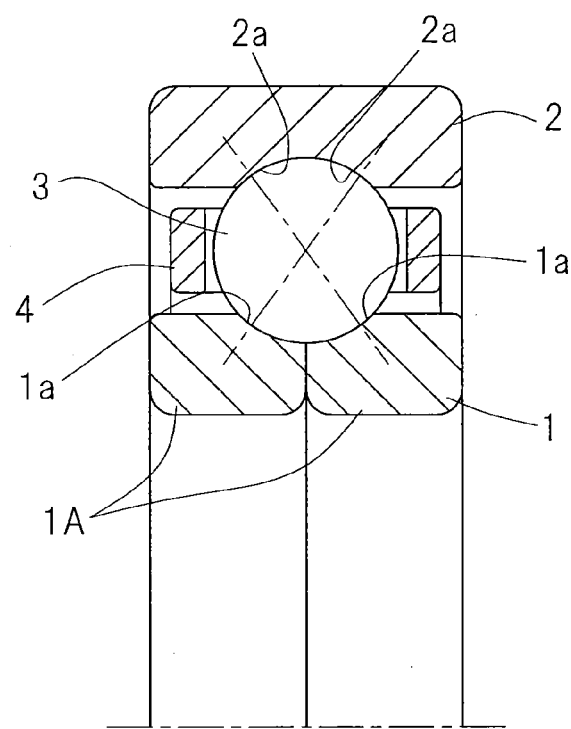
FIG. 1 is a fragmentary longitudinal sectional view showing one example of a four point contact ball bearing assembly that is an object to be calculated by a torque calculation method, device and program of the present invention for the four point contact ball bearing assembly.
Figure 2:
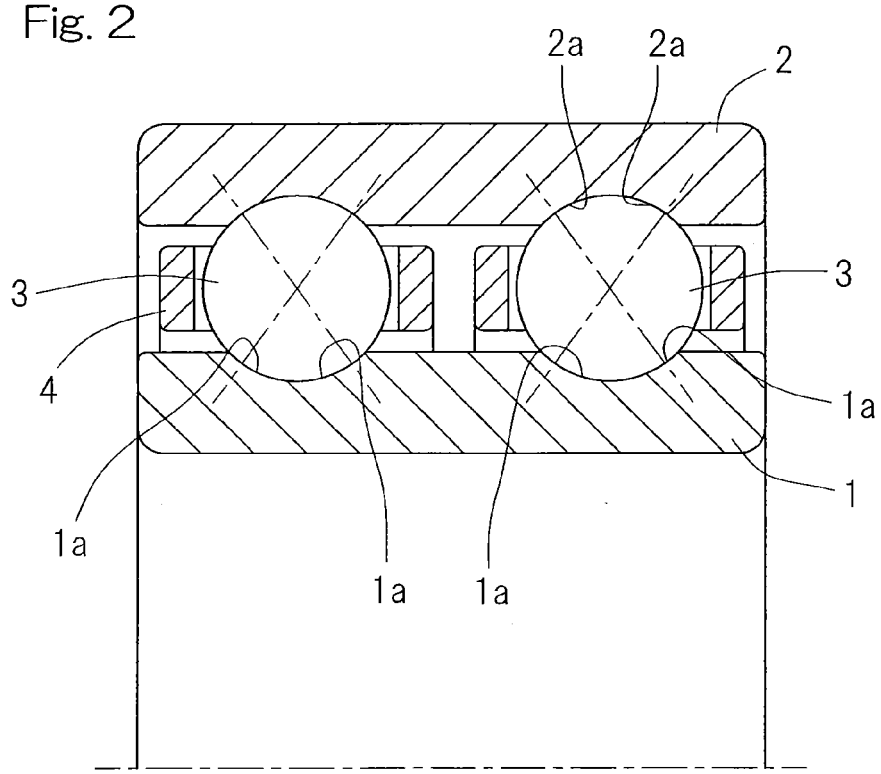
FIG. 2 is a fragmentary longitudinal sectional view showing one example of a double row four point contact ball bearing assembly.

One embodiment of the present invention will be described in detail with particular reference to the accompanying drawings. In particular, FIG. 1 illustrates one example of a four point contact ball bearing assembly which will become an object to be calculated. This four point contact ball bearing assembly is an example of a single row bearing assembly of a structure in which groove shaped partial raceways 1a and 1a, 2a and 2a defined in an inner ring 1 and an outer ring 2, respectively, contact rolling elements 3 in the form of balls at four points and in which a radial load and an axial load acting in both directions opposite to each other can be loaded. The two partial raceways 1a and 1a defined in the inner ring 1 are adjoined with each other in a direction axially of the bearing assembly to thereby define a single raceway that forms a raceway for the rolling elements 3. The inner ring 1, although shown as comprised of two inner ring halves 1A and 1A in the instance as shown, may be an unitary ring that is not divided. FIG. 2 illustrates an example of a dual row four contact ball bearing assembly, in which each of the inner ring 1 and the outer ring 2 is comprised of an unitary ring. Even the example shown in FIG. 2 may become an object to be calculated in accordance with the present invention.

Figure 3:
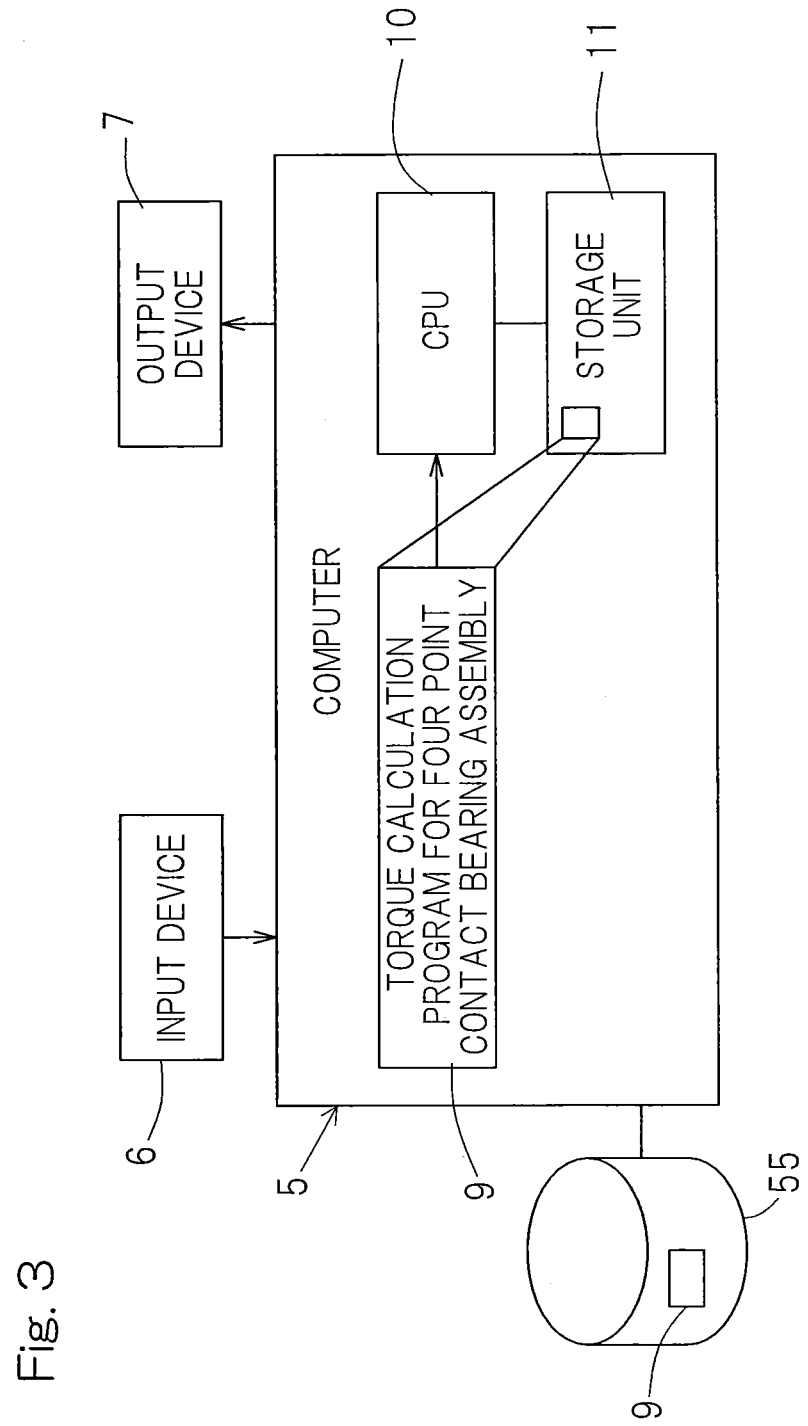
FIG. 3 is a block diagram showing an example of relation between programs for the torque calculating device and a computer, both used in the practice of the torque calculation method of the present invention.
Figure 4:
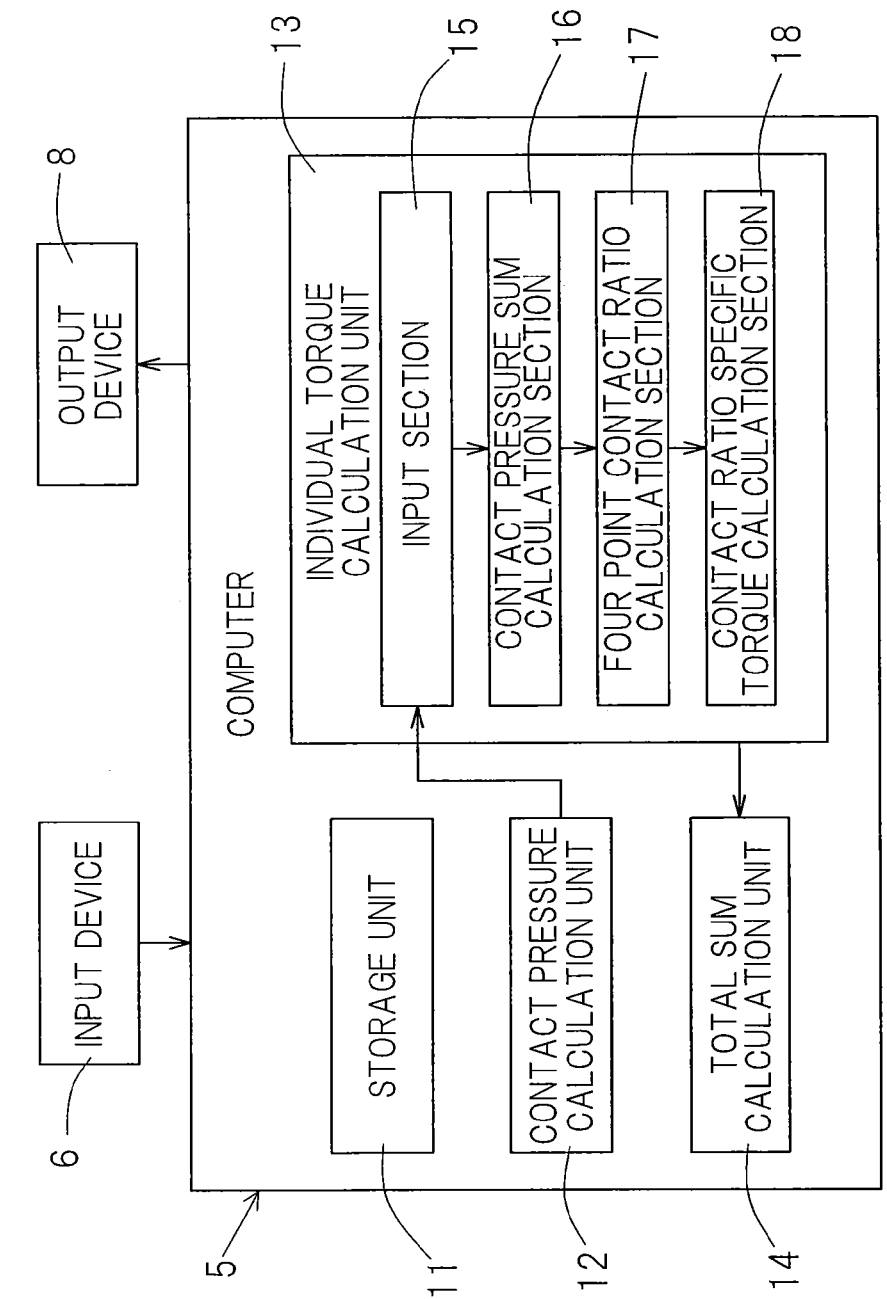
FIG. 4 is a block diagram showing a conceptual construction of the torque calculating device for the four point contact ball bearing assembly according to a embodiment of the present invention.

A torque calculation method for the four point contact ball bearing assembly is performed by causing a computer 5, shown in FIG. 3, to execute a torque calculation program 9 for the four point contact ball bearing assembly. The computer 5 is in the form of a personal computer and includes a central processing unit (CPU) 10 and a storage unit 11 such as, for example, a memory and is driven by a particular operation program. The computer 5 is electrically connected with an input device 6 such as, for example, a keyboard and/or a mouse and an output device 7 such as, for example, a display device such as, for example, a liquid crystal display device capable of displaying through a display screen, and/or a printer, or is provided with those devices as respective component parts of the computer 5. This computer 5 is also provided with a recording medium comprised of an external or built-in hard disc device 55 (the external device being shown in FIG. 3) and stores therein the torque calculation program 9 for the four point contact ball bearing assembly. Instead thereof, the torque calculation program 9 may be stored in a recording medium such as, for example, CD-ROM and may be readable by the computer 5 through a CD-ROM interface of the computer 5. This torque calculation program 9 is deployed in a memory 11 at the time a torque calculating process is executed, and various program commands of the program 9 are executed by the central processing unit 10. When the torque calculation program 9 for the four point contact ball bearing assembly is read in and executed by the computer 5 in the manner described above, a torque calculating device for the four point contact ball bearing assembly, of which various function accomplishing sections are shown in FIG. 4 in the form of blocks, is constructed. The detail of the structure of such device will be described later.

Figure 7A:
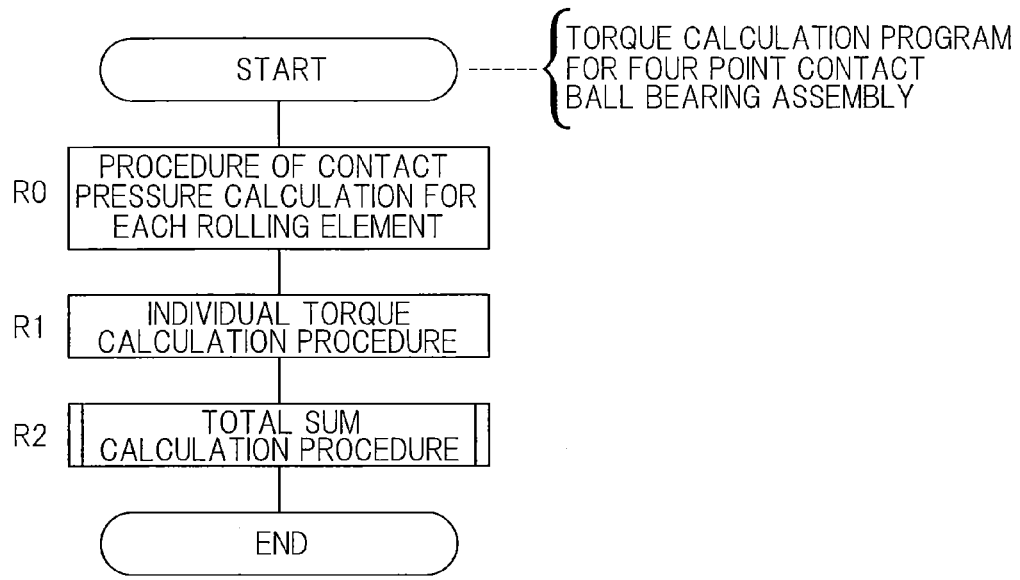
FIG. 7A is a flowchart showing the torque calculation program for the four point contact ball bearing assembly according to the embodiment of the present invention.
Figure 7B:
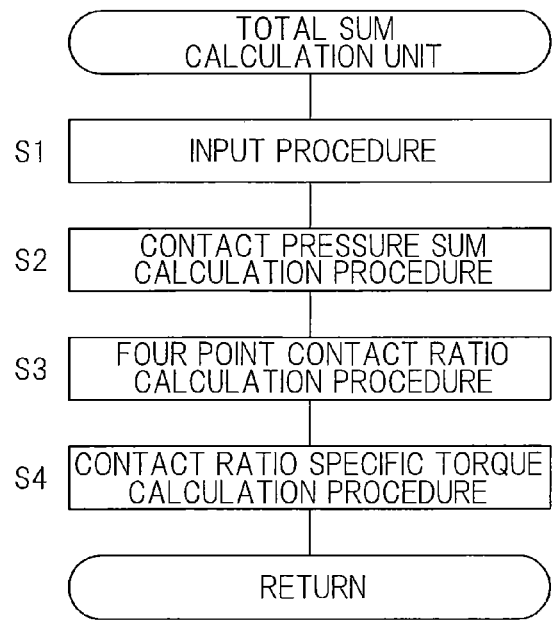
FIG. 7B is a flowchart showing a total sum calculating method.

The torque calculation program 9 is a program executable by the computer 5, causes the computer to calculate the rotational torque that acts between the inner and outer rings of the four point contact ball bearing assembly and includes various procedures shown in FIGS. 7A and 7B in the form of a flowchart. A calculation program 8 for calculating a contact pressure is also a program executable by the computer 5.

Figure 5A:
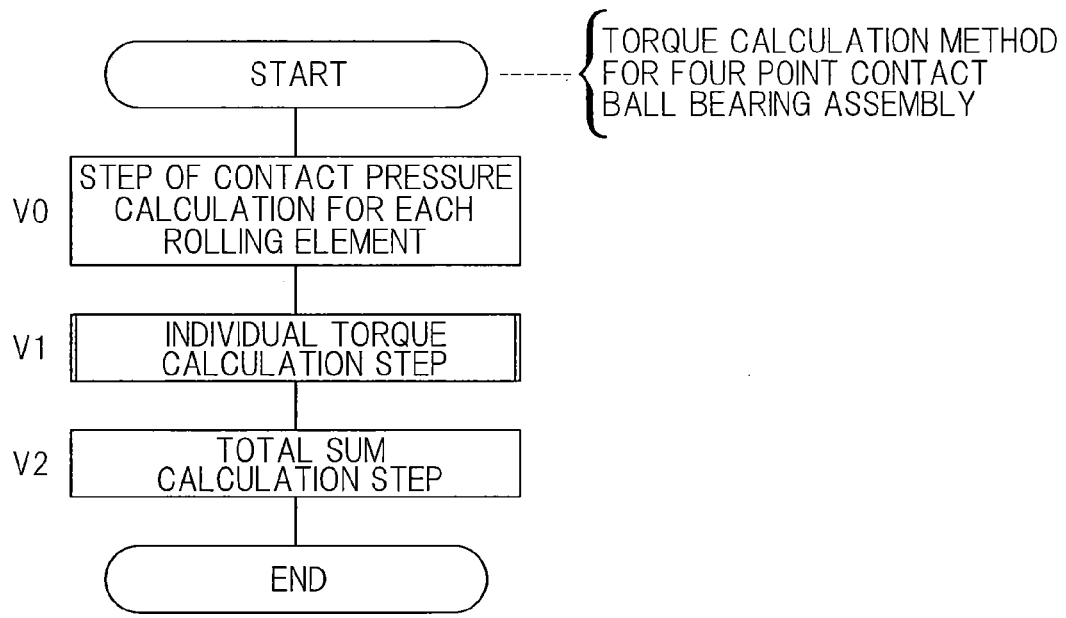
FIG. 5A is a flowchart showing the torque calculation method for the four point contact ball bearing assembly according to the embodiment of the present invention.

The torque calculation method for the four point contact ball bearing assembly includes, as shown in the flowchart of FIG. 5A, a contact pressure calculation step V0 for calculating the contact pressure of each of the rolling elements, an individual torque calculation step V1, and a total sum calculation step V2. In the individual torque calculation step V1, a rotational torque for each of the rolling elements in consideration of contact status. In the total sum calculation step V2, the total sum of rotational torques T of the rolling elements calculated in the individual torque calculation step V1 is calculated and then determined as the rotational torque TO that acts between the inner and outer rings. The step V0 referred to above is a sort of the preprocessing step.

Figure 5B:
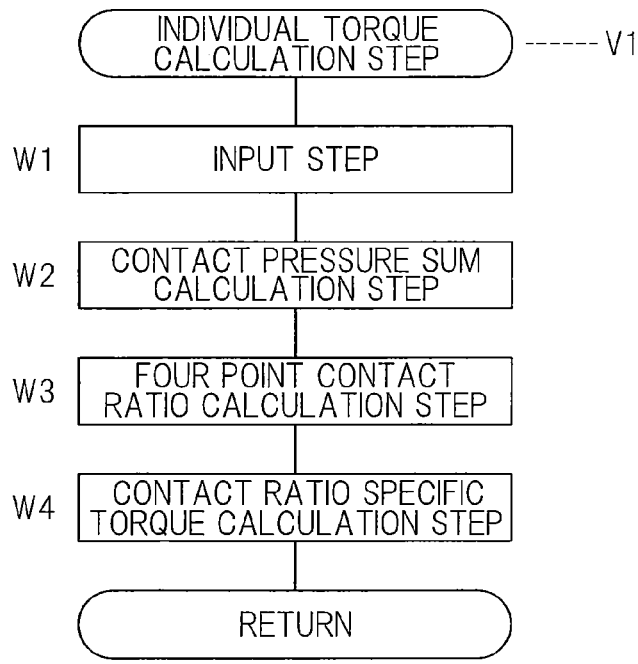
FIG. 5B is a flowchart showing specific contents of an individual torque calculation step V1.
Figure 6:
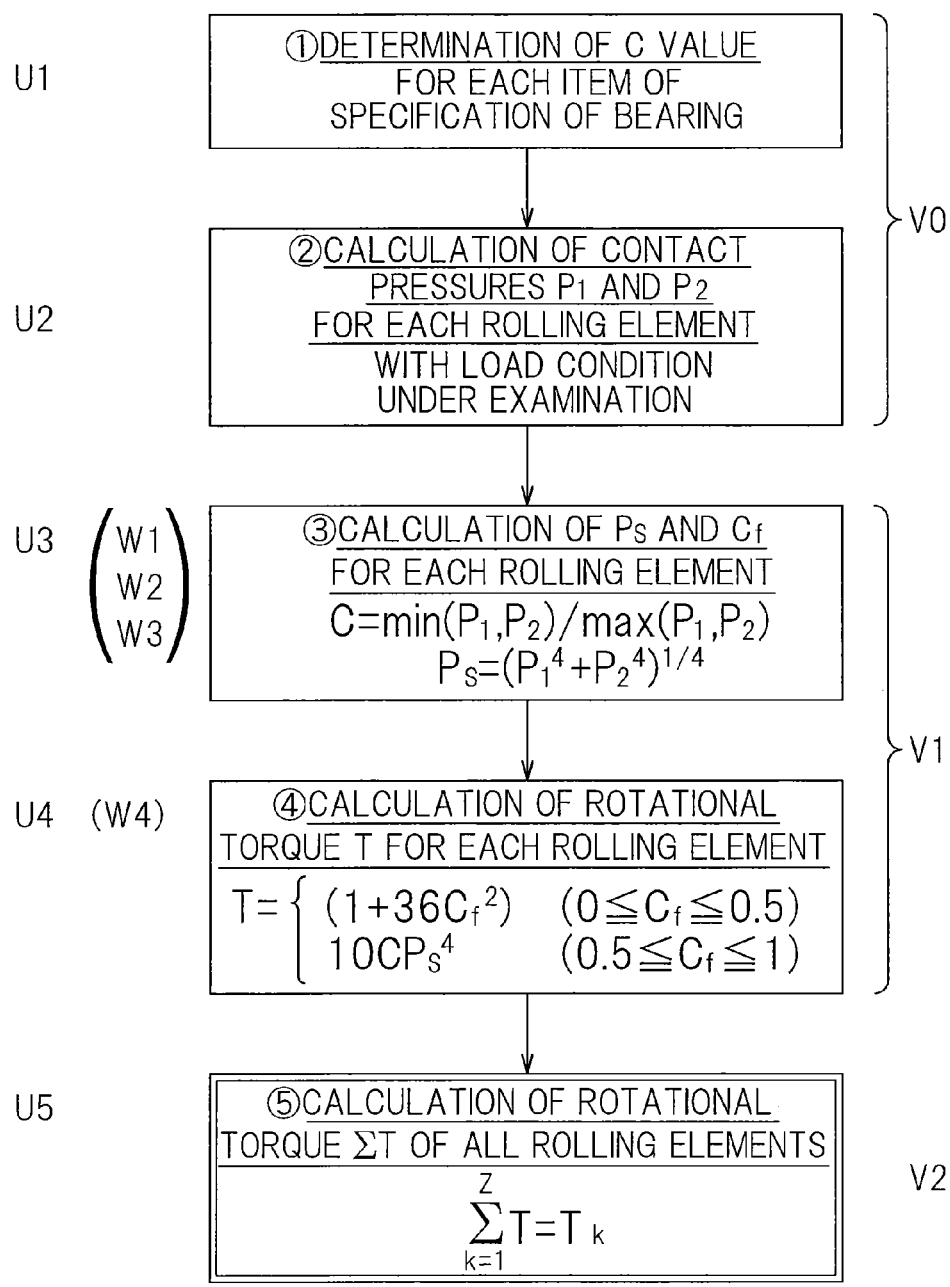
FIG. 6 is a flowchart that contains the torque calculation method and a preprocessing step.

Specific contents of the individual torque calculation step V1 are shown in the flowchart of FIG. 5B and contents of the various steps are shown in the flowchart of FIG. 6 together with calculation equations.

As shown in the flowchart of FIG. 6, in the practice of this method, a coefficient C for each bearing that may be an object to be calculated is first determined (V0). Since the coefficient C is a value that varies depending on items of specification of the bearing assembly (such as the number and dimension of the rolling elements and geometric shape of each of the raceways), the coefficient C is determined for each of the bearing assemblies. It is to be noted that the wording "determined for each of the bearing assemblies" referred to above does not necessarily mean that it is determined for each of the bearing assemblies, but the same value of the coefficient C may be employed for the same model number, that is, for the bearing assembly of the same shape, dimension and material. Thereafter, under a load condition to be studied, the maximum contact pressures $P_1$ and $P_2$ of the partial raceways 1a and 1a in the inner ring 1, shown in FIG. 1, and the rolling elements 3 are calculated. The calculation of the maximum contact pressures $P_1$ and $P_2$ will be explained later in connection with the establishment of the theory of a novel calculation equation that is used in the torque calculation in accordance with the present invention. Also, Since contact pressures act on the two raceways 2a and 2a in the outer ring 2 in a manner similar to the contact pressures acting on the two partial raceways 1a and 1a in the inner ring 1, the maximum contract pressures $P_1$ and $P_2$ of the outer ring 2 may be calculated.

In the practice of the individual torque calculation step V1, the maximum contact pressures $P_1$ and $P_2$ between the two partial raceways in the inner ring and the rolling elements in the individual rolling elements so calculated, respectively, and the coefficient C determined for each of the bearing assemblies are inputted at an input step W1 shown in FIG. 5B.

The individual torque calculation step V1 includes the input step W1, a contact pressure sum calculation step W2, a four point contact ratio calculation step W3 and a contact ratio specific torque calculation step W4. The input step W1 is such as described above.

The contact pressure sum calculation step W2 is a step, in which the contact pressure sum $P_S$ defined for the above described two maximum contact pressures $P_1$ and $P_2$ to be represented by a single parameter is determined by the following equation:

$$P_S = (P_1^4 + P_2^4)^{1/4}$$

The four point contact ratio calculation step W3 is a step, in which the four point contact ratio $C_f$, which is the ratio of the lower pressure relative to the higher pressure that is determined by the following equation:

$$C_f = \min(P_1, P_2) / \max(P_1, P_2) \quad 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$.

A step U3 shown in FIG. 6 illustrates collectively the steps W1 to W3 in the flowchart of FIG. 5B.

Referring to FIG. 5B, the contact ratio specific torque calculation step W4 (a step U4 shown in FIG. 6) is a step, in which the rotational torque T is calculated according to the following equations, using the contact pressure total sum $P_S$, the four point contact ratio $C_f$ and the coefficient C:

$$T = (\text{Quadratic function of the four point contact ratio } C_f) \times C \times P_S^4$$

when $0 \leq C_f < 0.5$, and $$T = I \times C \times P_S^4 \quad (I \text{ being a constant selected from 8 to 12})$$

when $0.5 \leq C_f \leq 1.0$.

The "quadratic function of the four point contact ratio $C_f$" referred to above may be chosen to be $(1 + 36 C_f^2)$. Also, the constant I referred to above is generally considered preferably 10.

Accordingly, it is preferred that when more specifically $0 \leq C_f < 0.5$, $$T = (1 + 36 C_f^2) C P_S^4$$

and when $0.5 \leq C_f \leq 1$, $$T = 10 C P_S^4$$

In the total sum calculation step V2 shown in FIG. 5A (a step U5 shown in FIG. 6), when expressed in terms of a mathematical expression, the rotational torque $\Sigma T$ of all of the rolling elements, which is obtained from the following equation (1), is calculated. It is to be noted that the parameter Z in the equation (1) represents the number of the rolling elements.

$$\sum_{k=1}^{Z} T = T_k \quad (1)$$

According to the torque calculation method for the four point contact ball bearing assembly according to this embodiment, the calculation is carried out in consideration of the contact condition representative of the extent of approximation to either one of the two point contact state and the four point contact state, and, therefore, the highly accurate value of the rotational torque, in which influences brought about by the difference in state of contact, that is a unique problem inherent in the four point contact ball bearing assembly, are taken into account, can be obtained.

The theory, which leads to the above described torque calculation method, and the result of studies will be described later.

FIGS. 7A and 7B illustrate the flowchart showing how the torque calculation program 9 for the four point contact ball bearing assembly is sequentially executed. This torque calculation program 9 is a program used to embody the torque calculation method shown in and described with particular reference to FIGS. 5A and 5B, and steps R0 to R2 and steps S1 to S4 correspond respectively to the steps V0 to V2, shown in FIG. 5A, and the steps W1 to W4 shown in FIG. 5B, respectively, but will be explained for clarification purpose.

The torque calculation program 9 is executable by a computer and is a program for calculating the rotational torque T0 acting between the inner and outer rings of the four point contact ball bearing assembly. This torque calculation program 9 includes;

an individual torque calculation procedure R1 for calculating the rotational torque T for each of the rolling elements, and a total sum calculation procedure R2 for determining the sum of the respective rotational torques T of all of the rolling elements, which sum is rendered to be the rotational torque T0 acting between the inner and outer rings. It is, however, to be noted that a procedure R0 for calculating the contact pressure of each of the rolling elements may be provided either as a part of the torque calculation program or as a step separate from the torque calculation program 9.

The individual torque calculation procedure R1 is made up of an input procedure S1, a contact pressure sum calculation procedure S2, a four point contact ratio calculation procedure S3 and a contact ratio specific torque calculation procedure S4.

The input procedure S1 is a procedure to store in a storage region of the storage unit 11, shown in FIGS. 3 and 4, when the maximum contact pressures $P_1$ and $P_2$ between the two partial raceways in the inner ring and the rolling elements in each of the rolling elements and the coefficient C determined for each of the bearing assemblies are inputted. This inputting may be either done from the input device 3 or collectively done from a file. Also, it may be a procedure to calculate by invoking the calculation procedure R0 and then to calculate, with a result of such calculation being inputted subsequently, in which case the calculation procedure R0 is executed subsequent to the input procedure S1.

The contact pressure sum calculation procedure S2 is a procedure to determine by the following equation the contact pressure sum $P_S$ defined for the two maximum contact pressures $P_1$ and $P_2$, so inputted as described above, to be represented by a single parameter:

$$P_S = (P_1^4 + P_2^4)^{1/4}$$

The four point contact ratio calculation procedure S3 is a procedure to calculate the four point contact ratio Cf, which is the ratio of the lower pressure relative to the higher pressure that is determined by the following equation:

$$C_f = \min(P_1, P_2) / \max(P_1, P_2) \quad 0 \leq C_f \leq 1$$

wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$.

The contact ratio specific torque calculation procedure S4 is a procedure to calculate the rotational torque T according to the following equations, using the contact pressure total sum $P_S$, the four point contact ratio $C_f$ and the coefficient C:

$T$=(Quadratic function of the four point contact ratio $C_f$)$\times C \times P_S^4$ when $0 \leq C_f < 0.5$, and $T = I \times C \times P_S^4$ (I being a constant selected from 8 to 12)

when $0.5 \leq C_f \leq 1$.

The "quadratic function of the four point contact ratio $C_f$" referred to above may be chosen to be $(1+36C_f^2)$. Also, the constant I referred to above is generally considered preferably 10.

Accordingly, it is preferred that when more specifically $0 \leq C_f < 0.5$, $T = (1+36C_f^2)CP_S^4$ and when $0.5 \leq C_f \leq 1.0$, $T = 10CP_S^4$ In the total sum calculation procedure R2 shown in FIG. 7A, using the equation (1) described in connection with the step U5 shown in FIG. 6, the rotational torque $\Sigma T$ of all of the rolling elements is calculated.

With reference to FIG. 4, the torque calculating device for the four point contact ball bearing assembly will now be described. This torque calculating device for the four point contact ball bearing assembly is a device for calculating the rotational torque T0 acting between the inner and outer rings of the four point contact ball bearing assembly and includes an individual torque calculation unit 13 for calculating the rotational torque T for each of the rolling elements, a total sum calculation unit 14 for determining the sum of the respective rotational torques T of all of the rolling elements, which sum is rendered to be the rotational torque T0 acting between the inner and outer rings, and a contact pressure calculation unit 12. The individual torque calculation unit 13 has a processing function that is performed in the individual torque calculation procedure R1 of the torque calculation program 9, shown in and described with particular reference to FIGS. 7A and 7B, and the total sum calculation unit 14 has a processing function that is performed in the total sum calculation procedure R2 of the torque calculation program 9. The contact pressure calculation unit 12 calculates the maximum contact pressures $P_1$ and $P_2$ between the two partial raceways in the inner ring and the rolling elements, respectively.

The individual torque calculation unit 13 includes an input section 15, a contact pressure sum calculation section 16, a four point contact ratio calculation section 17 and a contact ratio specific torque calculation section 18. The input section 15, the contact pressure sum calculation section 16, the four point contact ratio calculation section 17 and the contact ratio specific torque calculation section 18 have respective processing functions performed in the input procedure S1, the contact pressure sum calculation procedure S2, the four point contact ratio calculation procedure S3 and the contact ratio specific torque calculation procedure S4 of the torque calculation program shown in and described with particular reference to FIG. 7B, but will now be explained for clarification purpose.

The input section 15 stores in a storage region of the storage unit 11 when in each of the rolling elements the maximum contact pressures $P_1$ and $P_2$ between the two partial raceways in the inner ring and the rolling elements and the coefficient determined for each of the bearing assemblies are inputted. It is to be noted that this input section 15 may have a function of storing in a predetermined storage region when data, required to calculate the previously discussed maximum contact pressures P1 and P2 and the previously discussed coefficient C are inputted.

The contact pressure sum calculation section 12 determines the contact pressure sum $P_S$ defined for the two maximum contact pressures $P_1$ and $P_2$, so inputted as described above, to be represented by a single parameter is determined by the following equation:

$P_S = (P_1^4 + P_2^4)^{1/4}$

The four point contact ratio calculation section 17 calculates the four point contact ratio $C_f$, which is the ratio of the lower pressure relative to the higher pressure that is determined by the following equation:

$C_f = \min(P_1, P_2)/\max(P_1, P_2) \quad 0 \leq C_f \leq 1$ wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$.

The contact ratio specific torque calculation section 18 calculates the rotational torque T according to the following equations, using the contact pressure total sum $P_S$, the four point contact ratio $C_f$ and the coefficient C:

$T$=(Quadratic function of the four point contact ratio $C_f$)$\times C \times P_S^4$ when $0 \leq C_f < 0.5$, and $T = I \times C \times P_S^4$ (I being a constant selected from 8 to 12)

when $0.5 \leq C_f \leq 1.0$.

The "quadratic function of the four point contact ratio $C_f$" referred to above is preferably chosen to be $(1+36C_f^2)$. Also, the constant I referred to above is generally considered preferably 10.

Accordingly, it is preferred that when more specifically $0 \leq C_f \leq 0.5$, $T = (1+36 C_f^2)CP_S^4$ and when $0.5 \leq C_f \leq 1.0$, $T = 10CP_S^4$ The total sum calculation unit 14 calculates the rotational torque $\Sigma T$ of all of the rolling elements, using the equation (1) described in connection with the step U5 shown in FIG. 6.

The establishment of the theory of calculating the torque by means of the novel calculation equation that is employed in the practice of the foregoing embodiment of the present invention will now be explained.

Figure 8:
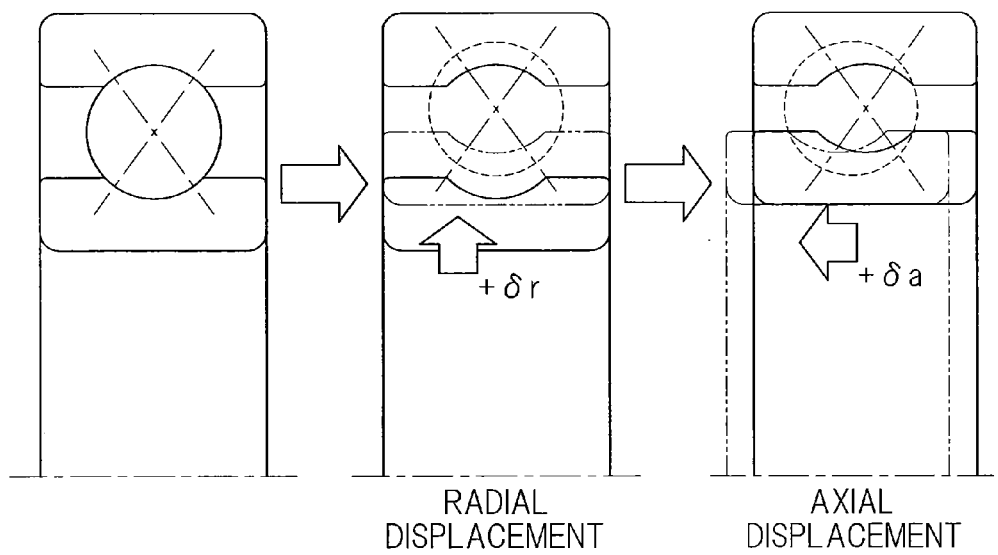
FIG. 8 is an explanatory diagram used to explain a study method that leads to the theory of the torque calculation method of the present invention, in which (A) illustrates a state in which an outer ring is fixed, (B) illustrates a state in which an inner ring is displaced in a radial direction, and (C) illustrates a state in which the inner ring is displaced in an axial direction.
Figure 9:
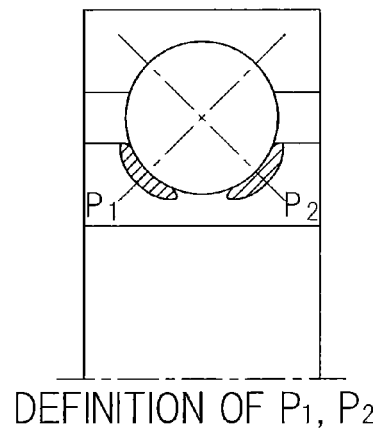
FIG. 9 is an explanatory diagram used to explain respective definitions of the maximum contact pressures $P_1$ and $P_2$.

Using a numerical analysis tool developed by the applicant, the relation between the rotational torque and the conditions of contact of the rolling elements with the raceways has been examined. With the analysis tool referred to above, calculation of the rotational torque exhibited by one rolling element is performed. It is to be noted that the calculation of the rotational torque is to determine the rotational torque, which is induced in the raceway ring about a center axis, by constraining the respective positions of the inner and outer rings and then utilizing a center position, which has been determined from the balance between the force and the moment, and the velocities and directions of rotation and revolution of the rolling elements. For the force acting on the rolling elements, the frictional force determined from a distribution of slides by determining a distribution of sliding velocities of the rolling elements and raceways within a contact ellipse in consideration of forces brought about from the four raceways as a result of elastic contact, and rotation and revolution of the balls. For the moment, the moment resulting from this frictional force is taken into account. While in a state (A), in which the outer ring is fixed as shown in FIG. 8, the inner ring is applied a displacement in the radial direction as shown in state (B) of FIG. 8 and, at the same time, a displacement in the axial direction as shown in state (C) of FIG. 8, the convergence calculation is carried out by changing the center position of the rolling elements and the velocities and directions of the rotation and the revolution so that all of the equations descriptive of the balance between the force and the moment of the rolling elements may be zero. As a result, the position of the rolling elements and others are outputted.

It is to be noted that a factor that is taken into account in connection with the bearing torque is limited to the friction occurring as a result of a slide within contact regions. Also, the coefficient of this friction is assumed based on the boundary lubrication and is employed in the form as associated with a function of only the sliding velocity. Although the torque calculation of the bearing assembly in its entirety is technically possible by applying the convergence calculation of the forces and moments of the rolling elements to all of the rolling elements, this involves a substantial amount of time required to finish the torque calculation or the condition tends to occur in which convergence is hard to accomplish, and, therefore, the calculating system of the present invention is effective to provide a stable result within a short length of time.

A variable representative of the extent to which the four point contact state shifts to the two point contact state is defined here. The respective maximum contact pressures between the two partial raceways in the inner ring and the rolling elements are defined as $P_1$ and $P_2$, and the ratio of the lower pressure relative to the higher pressure is defined as $C_f$:

$$C_f = \min(P_1, P_2)/\max(P_1, P_2) \quad 0 \leq C_f \leq 1$$

wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$.

Accordingly, when $C_f=0$, the perfect two point contact state occurs, and when $C_f=1$, the four point contact state of $P_1=P_2$ occurs as is the case when the net radial load is loaded.

Also, for simplification of the torque calculation equation in the description that follows, the contact pressure sum $P_S$ for representing the contact pressures of $P_1$ and $P_2$ by a single parameter is defined as follows:

$$P_S = (P_1^4 + P_2^4)^{1/4}$$

This is because in view of the relation discussed subsequently, the fourth power of the contact pressure is considered proportional to the rotational torque.

$$Pc \propto Q^{1/3} \text{ (Heltz's Theory of Point Contact)}$$

$$T \propto Q^{1.33} \text{ (Palmgren's Experimental Regression Equation)}$$

$$\therefore T \propto P^{3.99} \quad (3.99 \approx 4)$$

in which P represents the contact pressure, Q represents the rolling element load and T represents the rotational torque.

Figure 10:
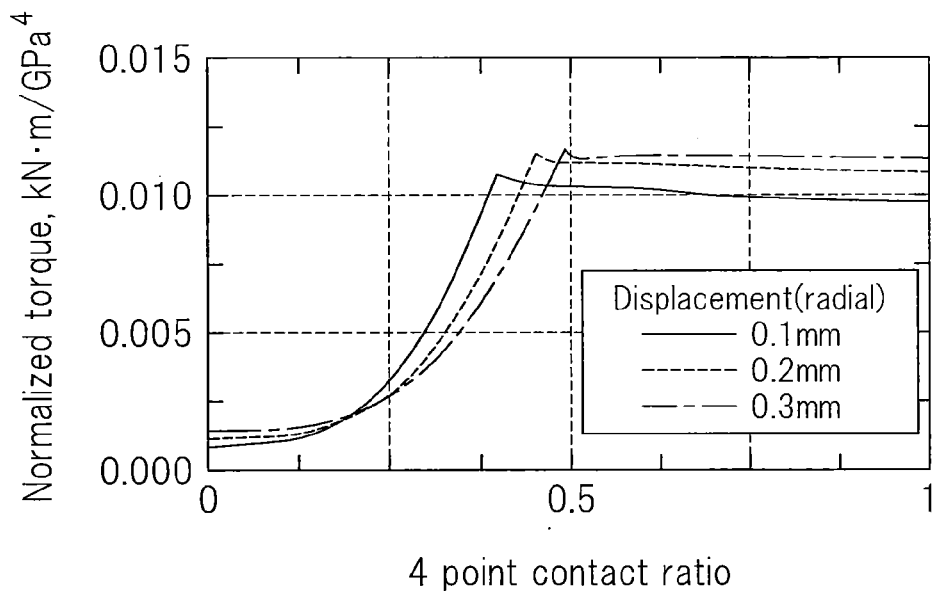
FIG. 10 is a chart showing the relation between a four point contact ratio $C_f$ and a torque.

If in one rolling element, the bearing torque relative to the four contact ratio $C_f$ is numerically calculated and the value of such torque divided by the contact pressure sum $P_S$ is then organized, such a relationship as shown in the chart in FIG. 10 is obtained. It will readily be understood that the torque, which is divided by the contact pressure sum, has a tendency to change on the border of the four point contact ratio $C_f$ of 0.5. The torque is substantially constant when the four point contact ratio $C_f$ exceeds 0.5 and results in the value that is about ten times as compared when $C_f=0$. In addition, when the four point contact ratio Cf is within the range of 0 to 0.5, the torque changes parabolically.

Figure 11:
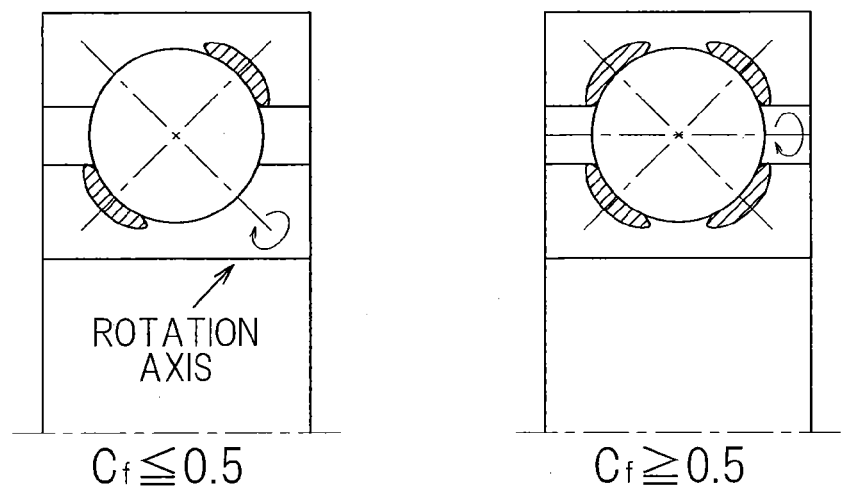
FIG. 11 is an explanatory diagram showing the relation between the four point contact ratio $C_f$ and a rotation shaft.

When the four point contact ratio $C_f$ exceeds 0.5, the four point contact state is established, in which as shown in FIG. 11, the axis of rotation of the rolling elements assumes a relation parallel to the bearing axis and a large distribution of slide velocity will occur within each of contact ellipses. On the other hand, when the four point contact ratio $C_f$ assumes a value up to 0.5, the axis of rotation of the rolling elements gradually changes from a condition similar to that in the angular contact ball bearing (FIG. 11) to a position at which the axis of rotation assumes a relation parallel to the bearing axis. Since at this time, the distribution of slide velocity within the contact eclipse gradually increases and, therefore, it increases parabolically as shown in the chart of FIG. 10.

From these results, the new torque calculation equation [T: Torque of one rolling element] is fixed as follows.

$$T = (1 + 36C_f^2)CP_S^4, \text{ when } 0 \leq C_f \leq 0.5$$

and $$T = 10CP_S^4, \text{ when } 0.5 \leq C_f \leq 1$$

In those equations, the parameter C represents the coefficient that depends on some items of the specification of the bearing assembly (such as geometric shapes of the rolling elements and the raceways), that is, for each of the bearing assemblies.

Hereinafter, the result of examination conducted to determine the validity of the foregoing equations will be discussed. (Examination on Rotational Torque for each Load Component)

Figure 12:
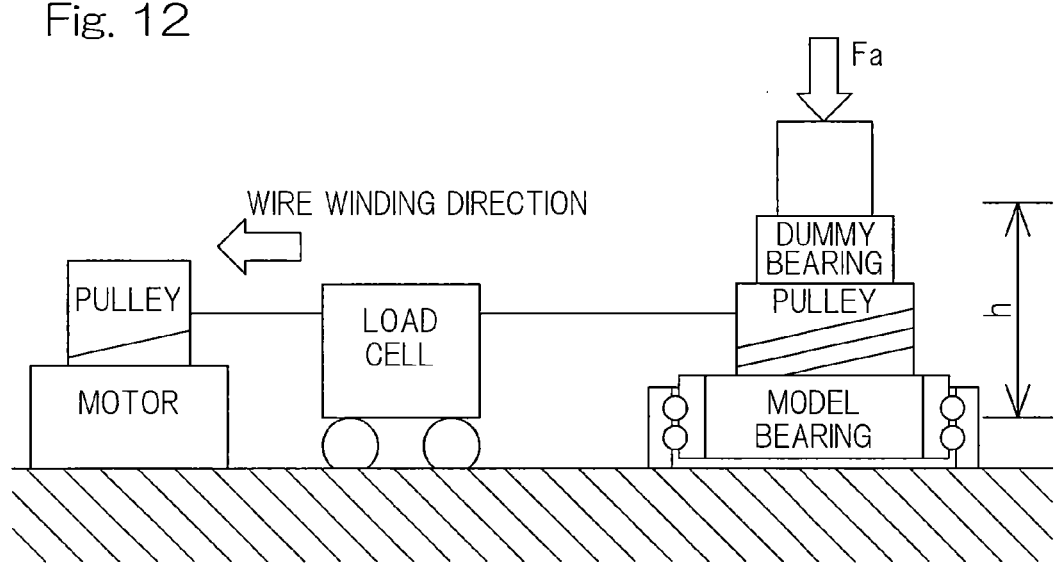
FIG. 12 is an explanatory diagram showing a conceptual construction of a torque measuring device used during a series of tests conducted to study the torque calculation method of the present invention.

In order to ascertain the validity of the novel calculation equation, a model bearing assembly of 500 mm in outer diameter was prepared and influences on by the rotational torque when each of the axial, radial and moment loads changes were endorsed. The torque measuring method is verified with the use of the torque measuring device shown in FIG. 12. In this testing machine, the axial load can be loaded in the form of the net axial load and the moment load is generated by loading the radial load at respective positions (shown by h in FIG. 12) spaced h=0.5, 0.75 and 1.0 meters in the axial direction from the bearing center.

1) Testing Method

Figure 13:
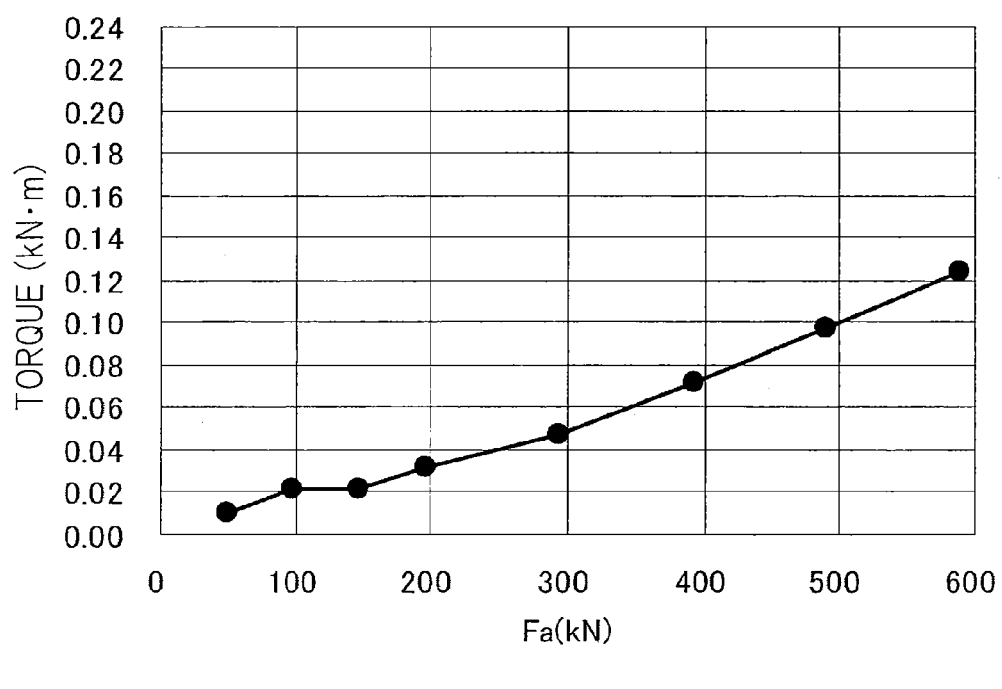
FIG. 13 is a chart showing a result of the tests (at the time of Fa loading)
Figure 14:
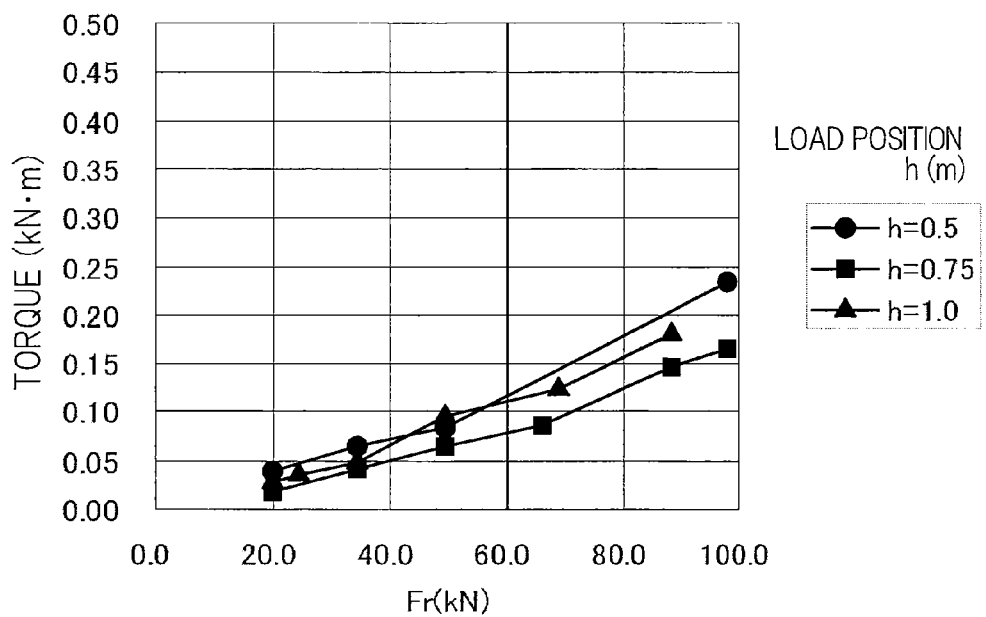
FIG. 14 is a chart showing a result of the tests (at the time of Fr loading)

Bearing Assembly: Model bearing assembly
(Double row four point contact ball bearing assembly)
Dimensions:
φ335 (inner diameter)×φ500 (outer diameter)×121 (width)
Mass: 70 kg
Coa: 2090 kN
Temperature Room temperature of about 25° C.
Rotational Speed: 1 min$^{-1}$
Grease: To the extent of amount applied to the raceways 2) Comparison between Test Result and Calculation Result:

The results of examination are shown in FIG. 13 (at the time of Fa loading) and in FIG. 14 (at the time of Fr+M loading). A dummy bearing assembly of the test machine shown in FIG. 12 was subjected to another torque test and the rotational torque of the model bearing assembly was determined by subtracting from the measured value.

Figure 15:
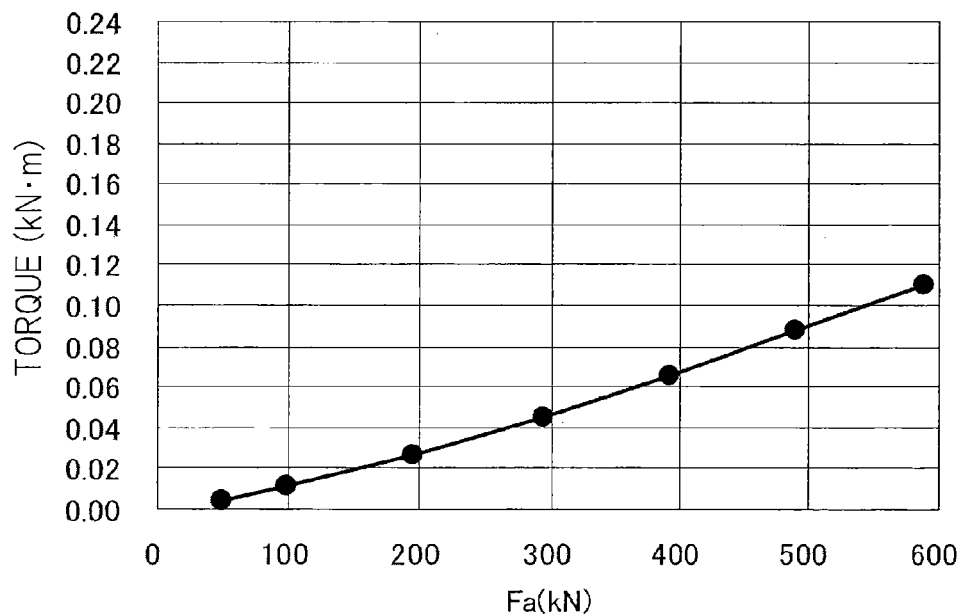
FIG. 15 is a chart showing a result of calculation (at the time of the Fa loading) according to the embodiment of the present invention.
Figure 16:
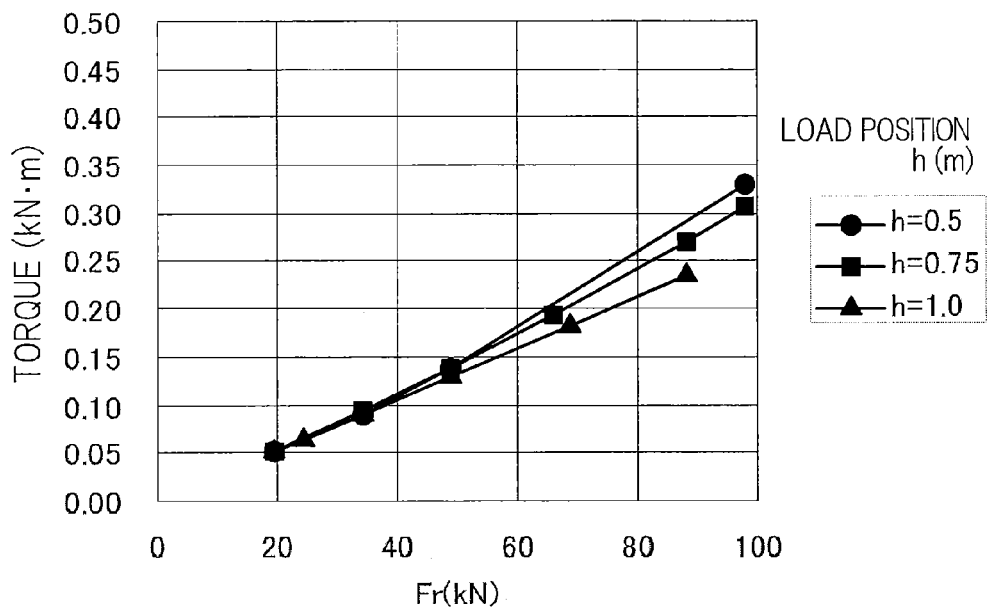
FIG. 16 is a chart showing a result of calculation (at the time of the Fr loading) according to the embodiment of the present invention.
Figure 17:
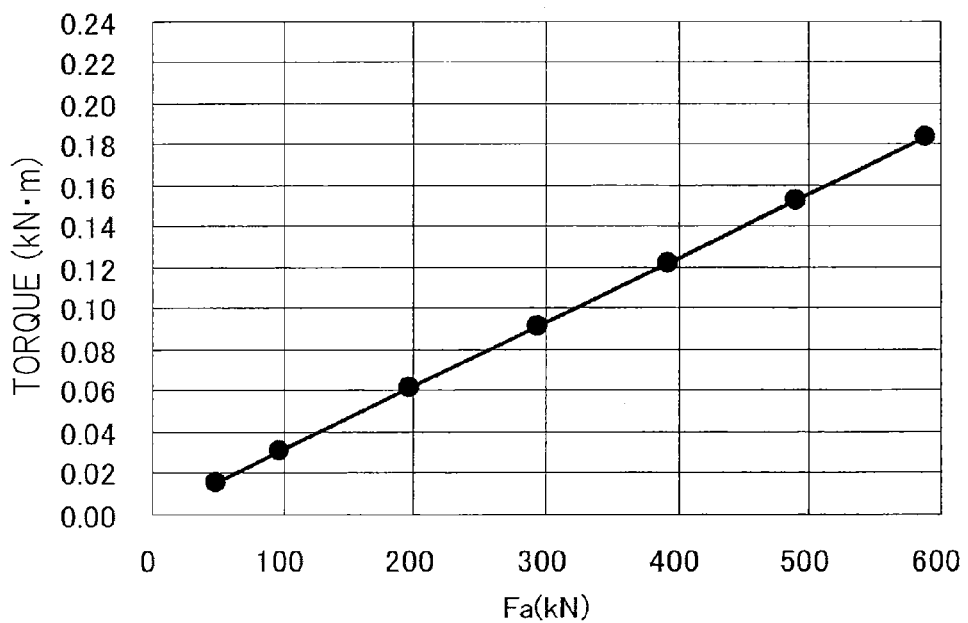
FIG. 17 is a chart showing a result of calculation (at the time of Fa loading) according to the conventional (currently employed) calculation equation.
Figure 18:
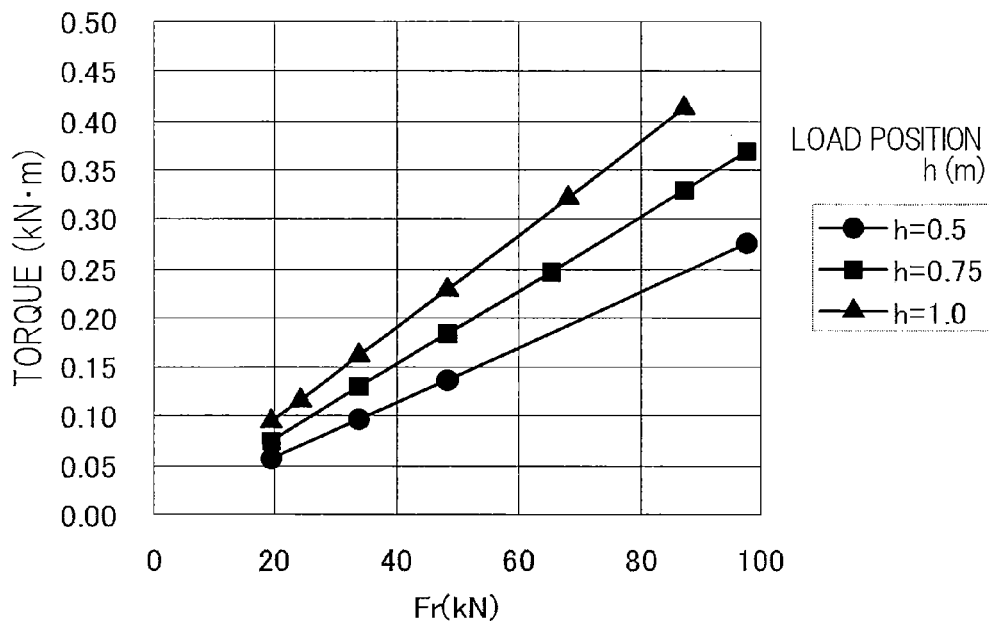
FIG. 18 is a chart showing a result of calculation (at the time of Fr loading) according to the conventional (currently employed) calculation equation.

Also, the result of the novel calculation equation is shown in FIGS. 15 and 16 and the result of the currently employed calculation equation is shown in FIGS. 17 and 18. It is to be noted that the currently employed calculation equation utilized μ=0.0015.

As shown by respective charts in FIGS. 13 and 14, as a result of the examination, the rotational torque was in proportion to both of the axial load and the radial load, and did not change much even when the moment load was increased. Although this result coincides well with that of the novel calculation equation, it does not coincide with the currently employed calculation equation.

They appear to have resulted from the contact condition (the two point contact state or the four point contact state) of the rolling elements. In the case of h=0.5 m, the moment load is low and the net radial load approximates and, therefore, the four point contact state of the rolling elements in a loaded region dominates. On the other hand, when h=1.0 m, the four point contact state changes to the two point contact state under the influence of the moment load ($C_f$ approximates to zero) and, therefore, the rotational torque does not increase even though the load on the rolling element increases.

(Examination on Rotational Torque for Each of Raceway Contact Conditions)

For further examination, an additional test was conducted using the same model bearing assembly.

1) Purpose:
An actual measurement is conducted to find how the rotational torque changes when the initial clearance (negative clearance) is varied and the axial load is loaded from that condition, to thereby verify the consistency of the novel calculation equation.

Figure 19:
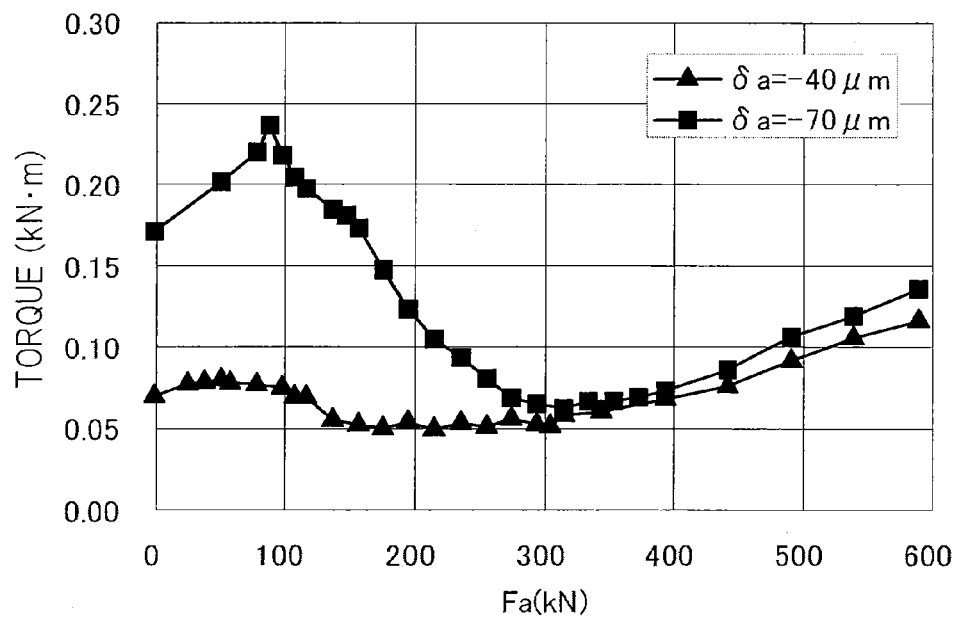
FIG. 19 is a chart showing a result of tests conducted to determine the relation between a load and a torque.
Figure 20:
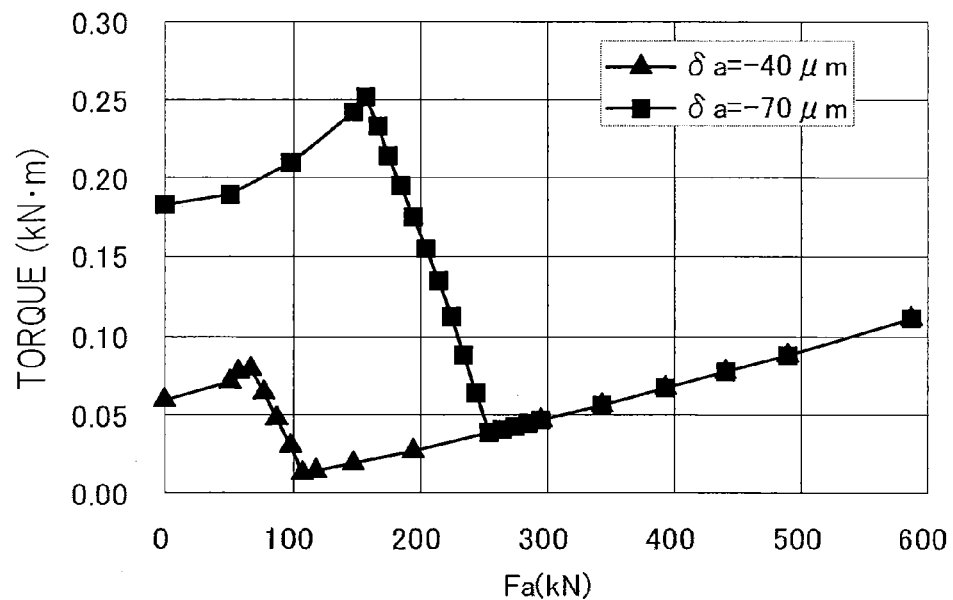
FIG. 20 is a chart showing the relation between the load and the torque, which will become a result of calculation of the calculation equation according to the embodiment of the present invention.

2) Test Conditions
Bearing Assembly: Model bearing assembly
(Double row four point contact ball bearing assembly. The same as that above tested bearing assembly)
Dimensions: φ335×φ500×121
Load Fa=0 to 588 kN
Initial Clearance (Negative Clearance), Contact Stress
(1) δa=−40 μm, Pmax=1042 MPa, $C_f$=1, $P_S$=1240 MPa
(2) δa=−70 μm, Pmax=1382 MPa, $C_f$=1, $P_S$=1644 MPa
Temperature Room temperature of about 25° C.
Rotational Speed: 1 min$^{-1}$ 3) Comparison Between Test Result and Calculation Result:
The results of examination are shown in FIG. 19 and the results of calculation are shown in FIG. 20.

(1) The actually measured values at Fa=0 (only a preload) coincided well with the calculated values. This appears to mean that that the torque proportion at $C_f$=1 and $C_f$=0 in the novel calculation equation is 10 times has been verified through the actual measurement.

(2) The tendency that increase of Fa is once followed by an increase of the torque, then decrease and again increase was equally found well in the test and the calculation equation. This is because the bearing torque decreases since although under the condition with the four point contact ratio $C_f$ being greater than 0.5, the torque increases as a result of an increase of the contact pressure, the bearing frictional coefficient decreases by the effect of a change of the axis of rotation when $C_f$ decreases below 0.5. However, under the perfect two point contact state ($C_f$=0) the bearing torque increases incident to the twice occurring increase. In the instance now under discussion, with respect to the characteristic of the change in the vicinity of the minimum value, it appears to be a factor that a transit period, in which the four point contact state changes to the perfect two point contact state differs between the calculated contact condition and the actual contact condition.

Figure 21:
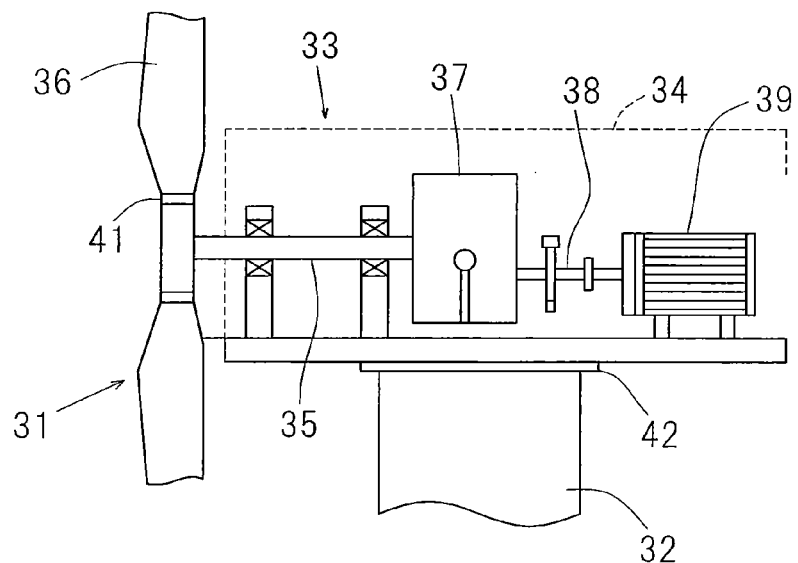
FIG. 21 is an explanatory diagram showing one example of a wind power generating equipment utilizing the four point contact ball bearing assembly which is the object to be calculated according to the embodiment of the present invention.

FIG. 21 illustrates one example of a wind mill for electricity generation by wind power of a kind utilizing the four point contact ball bearing assembly which forms the object to be calculated. This wind mill 31 is of a structure, in which a nacelle 33 is mounted on a support structure 32 through a bearing assembly 42 for yawing for rotation in a horizontal plane and a main shaft 35 is rotatably supported within a casing 34 of the nacelle 33. One of opposite ends of the main shaft 35, which protrudes outwardly from the casing 34, has a blade assembly mounted thereon for rotation together therewith. The blade assembly is made up of a plurality of blades 36 each being a swirler and supported angularly adjustably by a respective bearing assembly 41. The opposite end of the main shaft 35 remote from the blade assembly is coupled with a speed increasing machine 37 having its output shaft 38 connected with a rotor shaft of a power generator 39. The above described bearing assembly 42 for yawing and the above described bearing assembly 41 for changing the angle of each of the blades 36 make use of a four point contact ball bearing assembly which will become a slewing bearing assembly (that is, a turntable bearing assembly). Those bearing assemblies 41 and 42 are subjected to the torque calculation according to the embodiment of the present invention.

Figure 22:
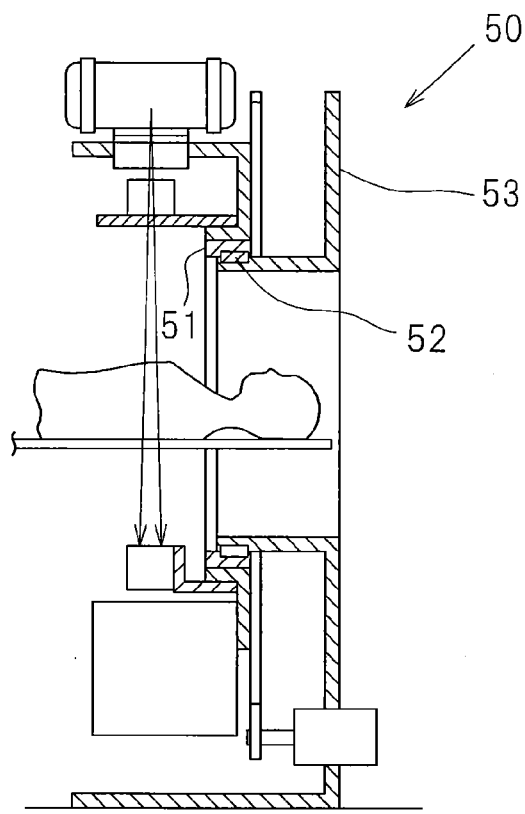
FIG. 22 is an explanatory diagram showing one example of a medical equipment utilizing the four point contact ball bearing assembly which is the object to be calculated according to the embodiment of the present invention.
Figure 23:
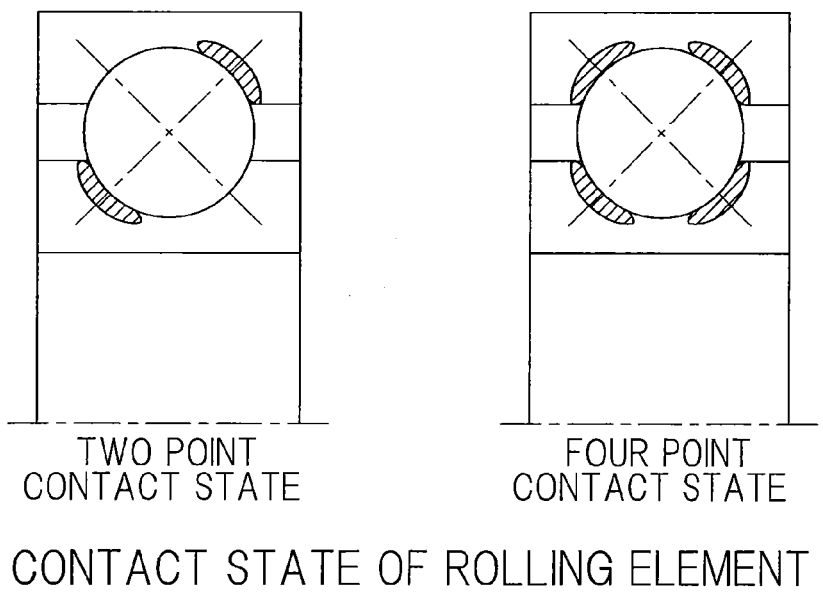
FIG. 23 is an explanatory diagram showing a two point contact state and a four point contact state in the four point contact ball bearing assembly.

FIG. 22 illustrates on example of a CT scanner 50 which is a medical equipment and which makes use of a gantry as an inspecting unit and an X-ray tube for imaging and a detector and others are provided on a rotary unit 51. This rotary unit 51 is rotatably supported by a frame 53 through bearing assemblies 52. The bearing assemblies 52 for this CT scanner • gantry are subjected to the torque calculation according to the embodiment of the present invention.

Each of the various embodiments hereinabove described may include the following modes.

[Mode 1]

A recording medium, which is readable by a computer, according to the mode 1 is a computer readable recording medium, in which a program for causing the computer to execute a torque calculation method of any one embodiment of the present invention is recorded, which program includes:

a procedure to calculate a contact pressure for each of rolling elements;

an individual torque calculation procedure for executing the individual torque calculation step; and a total sum calculation procedure for executing the total sum calculation step;

wherein the individual torque calculation procedure includes:

an input procedure for inputting and storing in a storage region, a load (Fr(Fx, Fy), Fa, M(Mx, My)), acting on a bearing assembly, and a coefficient C determined for each of bearing assemblies;

a contact pressure sum calculation procedure for calculating the contact pressure sum $P_S$, defined for the respective maximum contact pressures $P_1$ and $P_2$ between two raceways in an inner ring or an outer ring and rolling elements to be represented by a single parameter in the individual rolling elements, determined in the calculation procedure, is determined by the following equation:

$$P_S = (P_1^4 + P_2^4)^{1/4}$$

a four point contact ratio calculation procedure for calculating a four point contact ratio $C_f$, which is the ratio of the lower pressure relative to the higher pressure that is determined by the following equation:

$$C_f = \min(P_1, P_2)/\max(P_1, P_2)\ 0 \leq C_f \leq 1$$

wherein min($P_1$, $P_2$) represents one of $P_1$ and $P_2$ that is lower than the other of $P_1$ and $P_2$ and max($P_1$, $P_2$) represents one of $P_1$ and $P_2$ that is higher than the other of $P_1$ and $P_2$; and a contact ratio specific torque calculation procedure for calculating the rotational torque T according to the following equations, using the contact pressure total sum $P_S$, the four point contact ratio $C_f$ and the coefficient C;

$T$=(Quadratic function of the four point contact ratio $C_f$)×C×$P_S^4$ when $0 \leq C_f \leq 0.5$, and $T = I \times C \times P_S^4$ (I being a constant selected from 8 to 12)

when $0.5 \leq C_f \leq 1.0$.

[Mode 2]

A recording medium, which is readable by a computer, according to the mode 2 is a computer readable recording medium, in which a program for causing the computer to execute a torque calculation method of any one embodiment of the present invention is recorded, which program includes:

an individual torque calculation procedure for executing the individual torque calculation step; and a total sum calculation procedure for executing the total sum calculation step;

wherein the individual torque calculation procedure includes:

an input procedure for inputting and storing in a storage region, a load (Fr(Fx, Fy), Fa, M(Mx, My)), acting on a bearing assembly, and a coefficient C determined for each of bearing assemblies;

a contact pressure sum calculation procedure for calculating the contact pressure sum $P_S$, defined for the respective maximum contact pressures $P_1$ and $P_2$ between two raceways in an inner ring or an outer ring and rolling elements to be represented by a single parameter in the individual rolling elements, determined in the calculation procedure, is determined by the following equation:

$P_S = (P_1^4 + P_2^4)^{1/4}$ a four point contact ratio calculation procedure for calculating a four point contact ratio $C_f$, which is the ratio of the lower pressure relative to the higher pressure that is determined by the following equation:

$C_f = \min(P_1, P_2)/\max(P_1, P_2)$  $0 \leq C_f \leq 1$ wherein $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation procedure for calculating the rotational torque T according to the following equations, using the contact pressure total sum $P_S$, the four point contact ratio $C_f$ and the coefficient C;

$T$=(Quadratic function of the four point contact ratio $C_f$)×C×$P_S^4$ when $0 \leq C_f \leq 0.5$, and $T = I \times C \times P_S^4$ (I being a constant selected from 8 to 12)

when $0.5 \leq C_f \leq 1.0$.

The computer readable recording medium according to any one of the modes 1 and 2 may be such that calculation of the rotational torque T when $0 \leq C_f < 0.5$ may be carried out according to the following equation:

$T = (1 + 36 C_f^2) C P_S^4$

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
1a . . . Partial raceway
2 . . . Outer ring
2a . . . Partial raceway
3 . . . Rolling element
5 . . . Computer
8 . . . Contact pressure calculation program
9 . . . Torque calculation program for four point contact ball bearing assembly
13 . . . Individual torque calculation unit
14 . . . Total sum calculation unit
15 . . . Input section
16 . . . Contact pressure sum calculation section
17 . . . Four point contact ratio calculation section
18 . . . Contact ratio specific torque calculation section
31 . . . Wind mill
36 . . . Blade
41, 42 . . . Bearing assembly
50 . . . CT scanner
52 . . . Bearing assembly

What is claimed is:

1. A system including a driver, a four point contact ball bearing assembly having rolling elements, and a device to calculate a rotational torque T0 acting between inner and outer rings of the four point contact ball bearing assembly, comprising:

a contact pressure calculation unit for calculating the contact pressure for each of the rolling elements;

an individual torque calculation unit for calculating a rotational torque T for each of the rolling elements;

a total sum calculation unit for calculating the sum of respective rotational torques T of all of the rolling elements to determine the resultant sum to be the rotational torque T0 acting between the inner and outer rings; and a control unit to control the driver based on the calculated rotational torque T0, wherein the individual torque calculation unit includes an input section for inputting and storing in a storage region, a load (Fr(Fx, Fy), Fa, M(Mx, My)), acting on a bearing assembly, and a coefficient C determined for each of bearing assemblies;

a contact pressure sum calculation section for calculating the contact pressure sum $P_S$, defined for the respective maximum contact pressures $P_1$ and $P_2$ between two partial raceways that form respective raceways in the inner ring or outer ring and rolling elements to be represented by a single parameter in the individual rolling elements, determined according to $P_S = (P_1^4 + P_2^4)^{1/4}$;

a four point contact ratio calculation section for calculating a four point contact ratio $C_f$, which is the ratio of the lower pressure relative to the higher pressure, determined according to $C_f = \min(P_1, P_2)/\max(P_1, P_2)$, where $0 \leq C_f \leq 1$, $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T according to the following equations, using the contact pressure total sum $P_S$, the four point contact ratio $C_f$ and the coefficient C;

wherein T=(Quadratic function of the four point contact ratio $C_f) \times C \times P_S^4$ when $0 \leq C_f \leq 0.5$, and $T=I \times C \times P_S^4$, I being a constant selected from 8 to 12, when $0.5 \leq C_f \leq 1$.

2. A system including a driver, a four point contact ball bearing assembly having rolling elements, and a device to calculate a rotational torque T0 acting between inner and outer rings of the four point contact ball bearing assembly, comprising:

an individual torque calculation unit for calculating a rotational torque T for each of the rolling elements;

a total sum calculation unit for calculating the sum of respective rotational torques T of all of the rolling elements to determine the resultant sum to be the rotational torque T0 acting between the inner and outer rings; and a control unit to control the driver based on the calculated rotational torque T0, wherein the individual torque calculation unit includes an input section for storing in a storage region, when the respective maximum contact pressures $P_1$ and $P_2$ between two partial raceways, forming raceways in the inner ring or the outer ring, and rolling elements in the individual rolling elements, and a coefficient C determined for each of bearing assemblies are inputted;

a contact pressure sum calculation section for calculating the contact pressure sum $P_S$, defined for the respective maximum contact pressures $P_1$ and $P_2$ to be represented by a single parameter is determined according to $P_S=(P_1^4+P_2^4)^{1/4}$;

a four point contact ratio calculation section for calculating a four point contact ratio $C_f$, which is the ratio of the lower pressure relative to the higher pressure that is determined according to $C_f=\min(P_1, P_2)/\max(P_1, P_2)$ when $0 \leq C_f \leq 1$, $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T using the contact pressure total sum $P_S$, the four point contact ratio $C_f$ and the coefficient C according to T=(Quadratic function of the four point contact ratio $C_f) \times C \times P_S^4$ when $0 \leq C_f < 0.5$, and $T=I \times C \times P_S^4$, I is a constant selected from 8 to 12, when $0.5 \leq C_f \leq 1$.

3. The system as claimed in claim 1, wherein the calculation of the rotational torque in the contact ratio specific torque calculation section, when $0 \leq C_f < 0.5$, is carried out according to $T=(1+36 C_f^2) C P_S^4$.

4. A non-transitory recordable medium containing computer instructions stored therein for causing a computer processor to perform a torque calculation method for calculating a rotational torque T0 acting between inner and outer rings of a four point contact ball bearing assembly having rolling elements comprising calculating by a processor a rotational torque T for each of the rolling elements and calculating by the processor the sum of respective rotational torques T of all of the rolling elements to determine the resultant sum to be the rotational torque T0 acting between the inner and outer rings, where in calculating the rotational torque T for each of rolling elements, calculation is made using data on a contact condition representative of an extent of approximation to either one of a two point contact state and a four point contact state, the computer instructions comprising:

a contact pressure calculation procedure for calculating the contact pressure for each of the rolling elements;

an individual torque calculation procedure for calculating the rotational torque T for each of the rolling elements;

a total sum calculation procedure for calculating by the processor the sum of respective rotational torques T of all the rolling elements to determine the resultant sum to be the rotational torque T0 acting between the inner and outer rings; and a control procedure for controlling a driver based on the calculated rotational torque T0, wherein the individual torque calculation procedure includes an input procedure for inputting and storing in a storage region, a load (Fr(Fx, Fy), Fa, M(Mx, My)), acting on the bearing assembly, and a coefficient C determined for each of bearing assemblies;

a contact pressure sum calculation procedure for calculating the contact pressure sum $P_S$, defined for the respective maximum contact pressures $P_1$ and $P_2$ between two partial raceways that form respective raceways in an inner ring or an outer ring and rolling elements to be represented by a single parameter in the individual rolling elements, determined in a calculation step, according to $P_S=(P_1^4+P_2^4)^{1/4}$;

a four point contact ratio calculation procedure for calculating a four point contact ratio $C_f$, which is the ratio of the lower pressure relative to the higher pressure that is determined according to $C_f=\min(P_1, P_2)/\max(P_1, P_2)$, where $0 \leq C_f \leq 1$, $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T using the contact pressure total sum $P_S$, the four point contact ratio $C_f$ and the coefficient C according to T=(Quadratic function of the four point contact ratio $C_f) \times C \times P_S^4$ when $0 \leq C_f < 0.5$, and $T=I \times C \times P_S^4$, I being a constant selected from 8 to 12, when $0.5 \leq C_f \leq 1$.

5. A non-transitory recordable medium containing computer instructions stored therein for causing a computer processor to perform a torque calculation method for calculating a rotational torque T0 acting between inner and outer rings of a four point contact ball bearing assembly having rolling elements comprising calculating by a processor a rotational torque T for each of the rolling elements and calculating by the processor the sum of respective rotational torques T of all of the rolling elements to determine the resultant sum to be the rotational torque T0 acting between the inner and outer rings, where in calculating the rotational torque T for each of rolling elements, calculation is made using data on a contact condition representative of an extent of approximation to either one of a two point contact state and a four point contact state, the computer instructions comprising:

an individual torque calculation procedure for calculating the rotational torque T for each of the rolling elements;

a total sum calculation procedure for calculating by the processor the sum of respective rotational torques T of all of the rolling elements to determine the resultant sum to be the rotational torque T0 acting between the inner and outer rings; and a control procedure for controlling a driver based on the calculated rotational torque T0, wherein the individual torque calculation procedure includes an input procedure for inputting and storing in a storage region, a load (Fr(Fx, Fy), Fa, M(Mx, My)), acting on the bearing assembly, and a coefficient C determined for each of bearing assemblies;

a four point contact ratio calculation procedure for calculating a four point contact ratio $C_f$, which is the ratio of the lower pressure relative to the higher pressure that is determined according to $C_f=\min(P_1, P_2)/\max(P_1, P_2)$, when $0 \leq C_f \leq 1$, $\min(P_1, P_2)$ represents one of $P_1$ and $P_2$ that is lower than the other of $P_1$ and $P_2$ and $\max(P_1, P_2)$ represents one of $P_1$ and $P_2$ that is higher than the other of $P_1$ and $P_2$; and a contact ratio specific torque calculation section for calculating the rotational torque T using the contact pressure total sum $P_S$, the four point contact ratio $C_f$ and the coefficient C according to T=(Quadratic function of the four point contact ratio $C_f$)×C×$P_S^4$ when $0 \leq C_f < 0.5$, and T=I×C×$P_S^4$, I is a constant selected from 8 to 12, when $0.5 \leq C_f \leq 1$.

6. The non-transitory recordable medium as claimed in claim 4, wherein the calculation of the rotational torque in the contact ratio specific torque calculation section, when $0 \leq C_f < 0.5$, is carried out according to T=$(1+36 C_f^2)$ C $P_S^4$.

7. The non-transitory recordable medium as claimed in claim 5, wherein the calculation of the rotational torque in the contact ratio specific torque calculation section, when $0 \leq C_f < 0.5$, is carried out according to T=$(1+36 C_f^2)$ C $P_S^4$.

* * * * *

UNITED STATES PATENT AND TRADEMARK OFFICE
CERTIFICATE OF CORRECTION

PATENT NO. : 9,002,662 B2
APPLICATION NO. : 13/552822
DATED : April 7, 2015
INVENTOR(S) : Michio Hori et al.

It is certified that error appears in the above-identified patent and that said Letters Patent is hereby corrected as shown below:

In the Claims

Column 23, Lines 13-14, In Claim 6, delete "0 $C_f$<0.5," and insert -- $0 \leq C_f < 0.5$, --, therefor.
Column 23, Lines 17-18, In Claim 7, delete "0 s $C_f$<0.5," and insert -- $0 \leq C_f < 0.5$, --, therefor.

Signed and Sealed this
Eighth Day of September, 2015

Michelle K. Lee
*Director of the United States Patent and Trademark Office*